United States Patent
Kinde, Sr.

(10) Patent No.: US 8,453,428 B1
(45) Date of Patent: Jun. 4, 2013

(54) MODULAR ENGINE UNITS INCLUDING TURBINE ENGINE WITH COMBUSTION MEDIATING HUB

(76) Inventor: Ronald August Kinde, Sr., Clinton Township, MI (US)

( * ) Notice: Subject to any disclaimer, the term of this patent is extended or adjusted under 35 U.S.C. 154(b) by 0 days.

(21) Appl. No.: 13/102,355

(22) Filed: May 6, 2011

Related U.S. Application Data

(63) Continuation of application No. 11/702,047, filed on Feb. 5, 2007, now Pat. No. 7,937,945.

(60) Provisional application No. 60/854,625, filed on Oct. 27, 2006.

(51) Int. Cl.
*F02C 7/36* (2006.01)

(52) U.S. Cl.
USPC ............................................. 60/224; 60/39.15

(58) Field of Classification Search
CPC .......................................................... F02C 7/36
USPC .................... 60/224–225, 767, 39.15, 39.162, 60/791, 792, 39.42, 39.34, 39.35, 39.821
See application file for complete search history.

(56) References Cited

U.S. PATENT DOCUMENTS

| | | | |
|---|---|---|---|
| 2,577,919 A | 12/1951 | Roy | |
| 2,663,142 A | 12/1953 | Wilson | |
| 2,710,067 A | 6/1955 | Sforza Del Pesaro | |
| 3,060,679 A * | 10/1962 | Schmitt | 60/224 |
| 3,093,962 A | 6/1963 | Gluhareff | |
| 3,321,911 A | 5/1967 | Myles | |
| 3,371,718 A | 3/1968 | Bacon | |
| 3,462,955 A | 8/1969 | Lockwood et al. | |
| 3,514,956 A | 6/1970 | Bray | |
| 3,635,029 A | 1/1972 | Menioux | |
| 3,841,090 A | 10/1974 | Sharpe | |
| 4,006,591 A | 2/1977 | Cervenka | |
| 4,121,422 A * | 10/1978 | Flinn, Jr. | 60/597 |
| 4,122,816 A | 10/1978 | Fitzgerald et al. | |
| 4,180,028 A * | 12/1979 | Richter | 123/45 A |
| 4,280,797 A * | 7/1981 | Pfeil | 417/406 |
| 4,368,619 A | 1/1983 | Levesque | |
| 4,381,692 A | 5/1983 | Weintraub | |
| 4,693,075 A | 9/1987 | Sabatiuk | |
| 4,766,855 A | 8/1988 | Tozzi | |
| 4,934,140 A * | 6/1990 | Dennison et al. | 60/226.1 |
| 4,968,216 A * | 11/1990 | Anderson et al. | 415/199.5 |
| 5,174,108 A * | 12/1992 | Shekleton | 60/804 |
| 5,282,358 A * | 2/1994 | Schilling | 60/226.1 |
| 5,372,005 A | 12/1994 | Lawler | |
| 5,660,038 A | 8/1997 | Stone | |
| 5,704,321 A | 1/1998 | Suckewer et al. | |

(Continued)

*Primary Examiner* — Andrew Nguyen
(74) *Attorney, Agent, or Firm* — Young Basile

(57) ABSTRACT

A number of engines usable alone or in combination are taught herein. One engine comprises a housing, a drive shaft mounted within the housing, a first impeller and a second impeller mounted on the drive shaft for movement, and a combustion mediating hub between the second impeller and the first impeller and mounted for movement in both a clockwise and counter-clockwise direction with respect to the drive shaft, where the hub includes an annular plate, a first plurality of blades mounted on a first surface of the annular plate and facing the second impeller and a second plurality of blades mounted on a second, opposing surface of annular plate and facing the first impeller. An ignition source and a fuel source extend through the housing into an area between an outer peripheral wall of the annular plate and an inner wall of the housing.

20 Claims, 13 Drawing Sheets

U.S. PATENT DOCUMENTS

| | | | |
|---|---|---|---|
| 5,876,195 | A | 3/1999 | Early |
| 6,000,214 | A | 12/1999 | Scragg |
| 6,182,436 | B1 | 2/2001 | Prociw et al. |
| 6,308,898 | B1 | 10/2001 | Dorris, III et al. |
| 6,347,507 | B1 | 2/2002 | Lawlor |
| 6,506,015 | B2 * | 1/2003 | Nagata et al. .............. 415/173.1 |
| 6,666,018 | B2 | 12/2003 | Butler et al. |
| 6,763,812 | B2 | 7/2004 | Wheeler, Jr. et al. |
| 6,883,543 | B2 | 4/2005 | Tew et al. |
| 6,910,851 | B2 | 6/2005 | Franconi et al. |
| 6,912,854 | B2 | 7/2005 | Inoue et al. |
| 6,931,858 | B2 | 8/2005 | Venkataramani et al. |
| 7,134,842 | B2 | 11/2006 | Tam et al. |
| 7,499,477 | B2 | 3/2009 | Winklhofer et al. |
| 7,571,598 | B2 | 8/2009 | O'Brien et al. |
| 7,707,815 | B2 | 5/2010 | Murrow et al. |
| 7,736,206 | B1 * | 6/2010 | McChesney et al. ........ 440/61 T |
| 2002/0068250 | A1 | 6/2002 | Nalim |
| 2002/0088219 | A1 | 7/2002 | Meholic et al. |
| 2004/0081548 | A1 | 4/2004 | Zess et al. |
| 2004/0123583 | A1 | 7/2004 | Nordeen et al. |
| 2004/0172950 | A1 | 9/2004 | Venkataramani et al. |
| 2005/0016157 | A1 | 1/2005 | Okamoto et al. |
| 2005/0081508 | A1 | 4/2005 | Edelman et al. |
| 2005/0198957 | A1 * | 9/2005 | Kim ............................... 60/612 |
| 2006/0035182 | A1 | 2/2006 | Hesse et al. |
| 2006/0175306 | A1 | 8/2006 | Prociw et al. |
| 2006/0194513 | A1 | 8/2006 | Saxler et al. |
| 2006/0254252 | A1 | 11/2006 | Rasheed et al. |
| 2007/0006567 | A1 | 1/2007 | Matovich, Jr. |
| 2007/0180832 | A1 | 8/2007 | Kenyon et al. |
| 2009/0107436 | A1 | 4/2009 | Schultz |
| 2009/0241549 | A1 | 10/2009 | Clay et al. |
| 2010/0107602 | A1 | 5/2010 | Valentian |
| 2010/0126140 | A1 | 5/2010 | Hucker et al. |
| 2010/0147259 | A1 | 6/2010 | Kuhnert et al. |

* cited by examiner

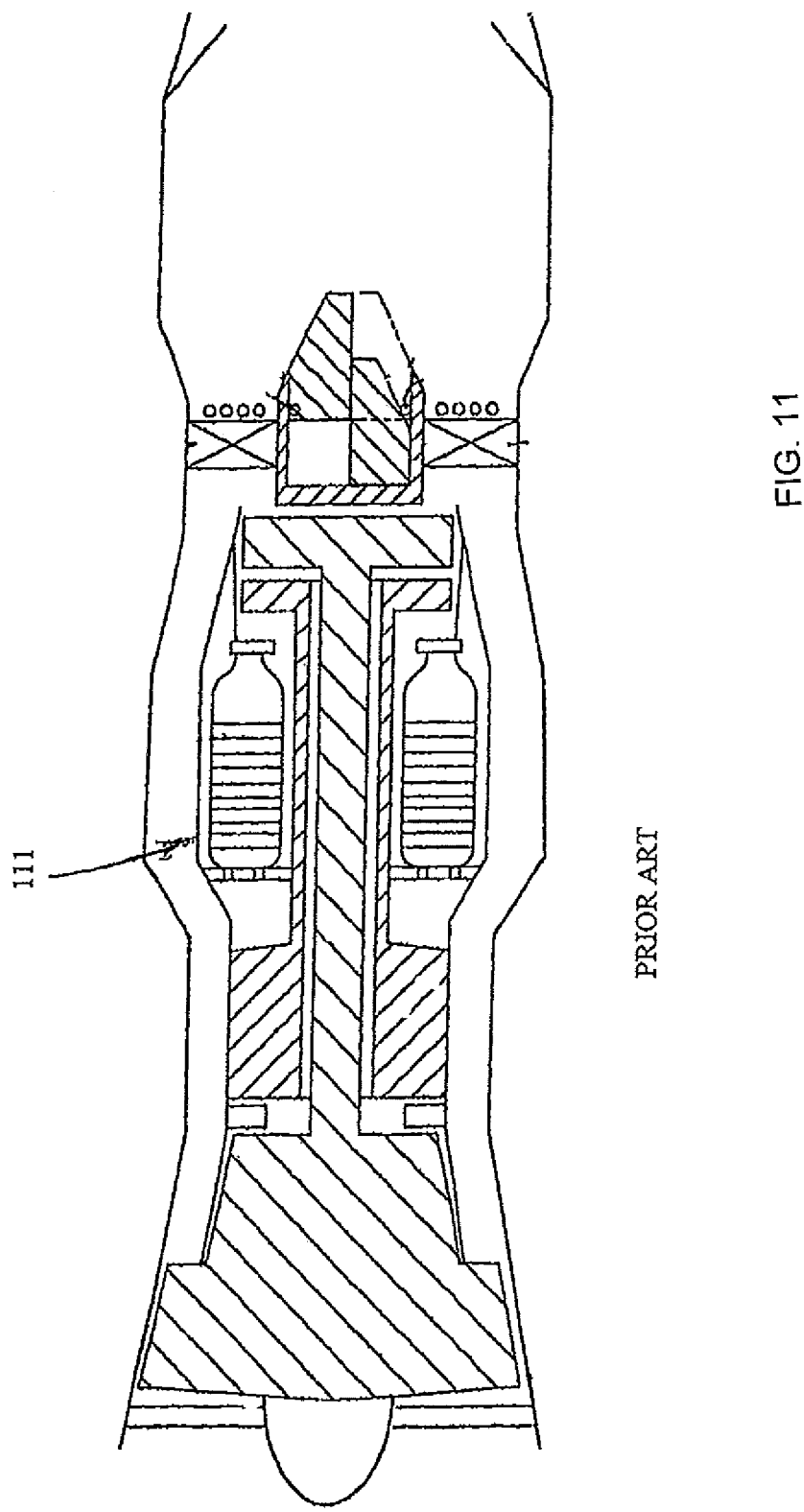

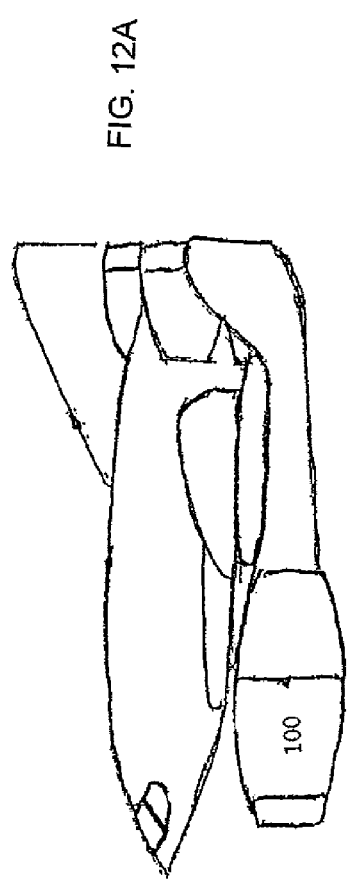
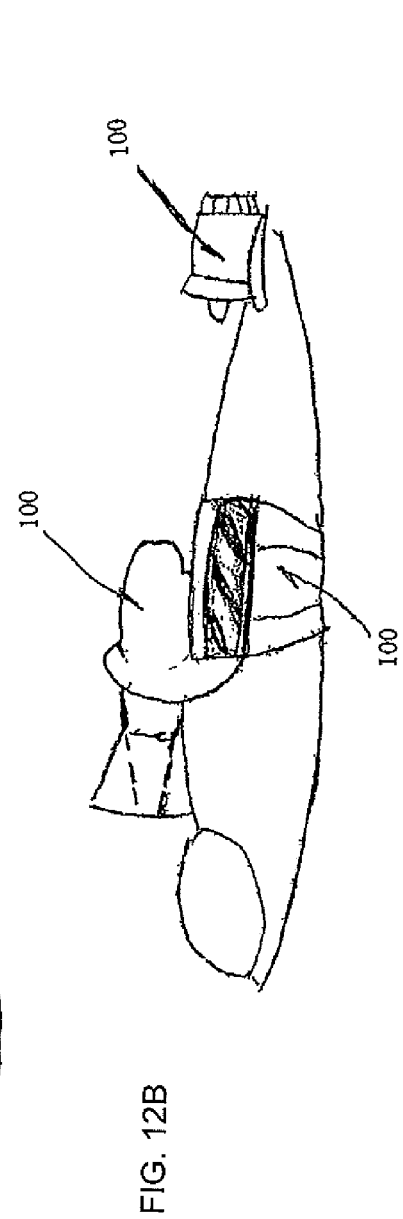
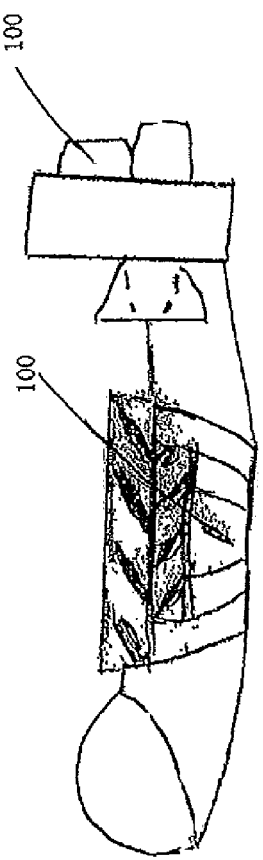
FIG. 12A
FIG. 12B
FIG. 12C

MODULAR ENGINE UNITS INCLUDING TURBINE ENGINE WITH COMBUSTION MEDIATING HUB

CROSS-REFERENCE TO RELATED APPLICATIONS

This application is a continuation of U.S. patent application Ser. No. 11/702,047, filed Feb. 5, 2007, which is incorporated herein in its entirety by reference and which is a non-provisional application claiming the benefit of U.S. Provisional Application No. 60/854,625, filed on Oct. 27, 2006.

FIELD OF THE DISCLOSURE

The disclosure generally relates to modular engine units including a turbine fan-jet engine, a free-piston engine and/or a Ramjet engine.

BACKGROUND

The ability of aircraft to travel at supersonic velocities puts great demands on the aircraft's propulsion system. Travel at supersonic velocities means an increase in weight of both airplane and fuel at take off and becomes an exponential increase in the power required, particularly at zero velocities. To meet such unprecedented demands for lift and thrust propulsion, different types and categories of engines and engine cycles used separately or in tandem have been proposed and some have been referred to as combined-cycle engines.

A great amount of power can be made available if an oxidizer is chemically or physically combined with the fuel, or otherwise carried separately, as is the case with rockets. But this must be done judiciously because oxygen weighs many times more than hydrogen and can lead to mixtures that are very fast acting and explosive. This added weight must be overcome, adding inertial liabilities to the operational proficiencies, particularly from zero velocity start up through low speed takeoff procedures. Exponentially larger fuel and oxidant requirements are required over propulsion systems that acquire oxygen from the ambient air and do not have to carry the added weight of the oxidizers as well as carrying the heavy containment tanks. Further, the impulse velocity resonance of the rocket combustor is limited by the physical constraints of dimension parameters and efficiency losses at low speed operation. Impulse resonance reaction times and burning rates measured in thousands of a second are produced within the combustion reaction cones while achieving exhaust velocities that may reach 21,000 feet per second relative to the rocket at all operational speeds with correspondingly high operating temperatures. This allows such rockets to realize concomitant equal and opposite reaction response, accumulating very high maximum escape velocities providing they reach the frictionless expansions of space quickly, which they can do. Mandating very abrupt times to reach optimum altitude and velocity causes the rockets to expend all their vast fuel and oxidant reactants in the range of four minutes, more or less. Liquid reactant rockets are complex and expensive and predisposed to malfunction.

Solid propellant rockets, although very simple, are made up of reactants that are usually toxic and polluting and not prone to easy restarting. All aspects of rocketry must be considered before deciding to integrate their propulsive drive into hybrid interaction with the driving potential of Ram or Scramjet air-breathing engines. There are more versatile, efficient, high performance alternatives available that utilize less overtly explosive hypergolic reactants, which are prone to be expensive, tricky to use (sensitive and temperamental), dangerous, poisonous, highly polluting and a very wasteful means of lifting weights into space or near space upper altitudes being loaded down as they are with onboard oxidants.

Conventional by-pass turbojet engines with afterburners can be made to function as a "combined-cycle" engine if part of the intake air is shunted around the core by-pass turbojet engine and directed into the afterburner. Then once having obtained transition velocity, the engine is run as a Ramjet engine by shutting down or shutting off the core by-pass turbojet engine. The by-pass turbojet engine may be run acting to supercharge the Ramjet conformation variation. It is not hard to visualize the two aspects of both engine functions being run simultaneously. The ramjet bypass conforming aspect of the engine can be run relatively independent of the core by-pass turbojet engine, and it is this characteristic of the engine design that has become referred to as a combined-cycle turbojet engine. Such an arrangement is shown in FIG. 11, which is reproduced from Edelman, U.S. Patent Pub. No. 2005/0081508 A1, published on Apr. 21, 2005. In FIG. 11, element 111 indicates the combustion chamber vessels and arrangements.

SUMMARY

In contrast to the above are modular engine units with improved airflow. One engine taught herein comprises an engine housing, a drive shaft mounted within the engine housing, a first impeller mounted on the drive shaft for movement therewith, a second impeller mounted on the drive shaft for movement therewith, and a combustion mediating hub located between the second impeller and the first impeller and mounted on the drive shaft for movement in both a clockwise and counter-clockwise direction with respect to the drive shaft. The combustion mediating hub includes an annular plate, a first plurality of blades mounted on a first surface of the annular plate and facing the second impeller and a second plurality of blades mounted on a second, opposing surface of annular plate and facing the first impeller. This engine embodiment also includes an ignition source extending through the engine housing into an area between an outer peripheral wall of the annular plate and an inner wall of the engine housing and a fuel source extending through the engine housing into the area between the outer peripheral wall of the annular plate and the inner wall of the engine housing.

Another engine taught herein comprises a combustor zone, a conically-shaped air intake cowling having a narrower end and a wider end, the narrower end of the air intake cowling coupled to the combustor zone, a conically-shaped air exhaust cowling having a narrower end and a wider end, the narrower end of the air exhaust cowling coupled to the combustor zone, an igniter extending into the combustor zone, a cone-shaped cowling extending about the air intake cowling, an annular ignition pre-chamber extending about the combustor zone and separated from the cone-shaped cowling by a partitioning wall including an annular bypass duct, at least one fuel injector orifice jet extending into the ignition pre-chamber, and at least one igniter extending into the ignition pre-chamber.

In addition, an engine taught herein comprises a drive shaft housing a piston, a piston housed within the drive shaft, a first combustion chamber located at a first end of the drive shaft and in communication with a first end of the piston, a second combustion chamber located at a second end of the drive shaft and in communication with a second end of the piston, a respective ignition source extending into each of the first and second combustion chambers, a respective fuel input extending into each of the first and second combustion chambers, a respective oxidant input extending into each of the first and second combustion chambers, and an output device coupled to the drive shaft for movement therewith.

These engines can be combined to form other engines. One such engine is a free piston detonation cycle engine, which provides a unique combination within the central drive shaft of an equal and opposite acting supercharging turbine fan-jet engine to form a combined-cycle turbine engine. This is called a combined-cycle engine due to the use of a detonation cycle engine and a deflagration cycle engine incorporated to act as one combined engine. When the free piston detonation cycle engine is used co-operatively as a supercharger and booster for the unique (selectively reversible) turbine fan-jet engine for novel (optionally reversible) Ramjet engines or Ramjet conformation engines, the free piston detonation cycle engine will be referred to as a unit of such engines. Note that the free piston aspect of the detonation cycle engine isn't in itself reversible and needs to be shut down upon reversing the turbine engine's rotational direction. Hereinafter, references to Ramjet engines include Ramjet conformation engines unless otherwise stated.

To maximize the operation of the combined-cycle supercharging fan-jet turbine engine and improve the overall performance of the unit, it becomes imperative to understand what occurs when this unique supercharging turbine fan-jet engine is run while being "oxygen-boosted" by its free piston detonation cycle engine component. These two engines, collectively called a "combined-cycle engine" hereinafter, can operate concurrently with optional by-pass supercharge injecting air and fuel and selectively injecting compressed oxygen into the systems. The free piston component of the combined-cycle engine is allowed to act as an excellent explosive charge-starting engine for the turbine engine component and otherwise to boost its performance. Detonation cycle engines use fuel and pure oxidant mixtures and function where purely air-aspirated engines cannot (without some sort of rocket assistance) because the velocity or the ambient air pressure and oxygen content are too low. Detonation occurs whenever the gaseous fluid velocity attempts to exceed the speed of sound within the confines of the detonation chamber of the engine, allowing for vary rapid speeds of operation.

One form of this invention comprises a combination of engine types and categories, referred to as "the unit" for providing propulsive thrust and power. The unit includes compartments, which may also be called pods or modular units, including within them a series of unique engines. A unit can contain a unique equal and opposite turbine fan-jet supercharging engine module with a central pure oxidant aspirated free piston engine. This combined-cycle engine can be used to produce thrust and to supercharge a Ramjet engine. Thrust is produced when the unit has a velocity or air density that is less than that required to operate the Ramjet engine of the engine combination.

The Ramjet engine, upon reaching a predetermined speed or a transitional velocity of approximately 3 Mach or less (some Ramjet designs develop propulsive thrust at 300 miles an hour or less) then takes over a portion or all of the propulsive thrust of the combined-cycle engine. The advantage of being able to reverse the thrust of the Ramjet engine and/or the turbine engine aspect of the unit cannot be over emphasized. Extreme deceleration to aid in "re-entry" and other types of braking and ultra tight turning, elevating and evasive maneuvers are made possible, and a unit construction offering the strength and movement and/or stability capability necessary to take advantage of this potential has been incorporated into this invention.

The final stage may be the launch of rockets or Ramjet engine pod/modules or other vehicles designed to operate individually, in tandem or altogether within the unit concept. Modules can be made to be interchangeable or exchangeable or reversible.

The Ramjet engine housing includes at least one air inlet to a combustion tube or zone. A supplementary supercharging means and connective conduit situated around this zone creates a space, fore and aft, around the combustion chamber section, and a second inlet is disposed laterally and tangentially into the combustion section. This space may constitute an apex and/or vortex vestibule section and may act as a combustion and/or pre-combustion Venturi like reduced air pressure and increased air velocity recirculation zone.

A combustion zone consists of an annular internal section of the engine-housing wall furnished with central fuel injection and ignition flow directing channels or a dump step and quarl injector and at least one inlet port and one exhaust port and nozzle. This circumferential conduit may be part of the connecting structure of the unit, as for instance, a pod or part of a wing structure and includes an inlet housing that opens into the housing of the supercharging section of the unit.

In a variation, air-conducting conduits conform in and around the supercharging engine housing that converges tangentially and is situated so as to produce a convergent apex and/or vortex flow effect toward the inlet port(s) to the combustion zone. The conduits may be accentuated with the use of angle deflecting or directing tubes, vanes, blades, gates, ports, steps, partitions or other such stationary or moveable elements. The air inlet housing is coupled to the combustor inlet and defines a hollow interior volume intersecting tangentially and convergent toward the after combustor zone (also called an afterburner section). The hollow interior volume may house the turbine-jet engine. An apex or vestibule like conformation is defined, which may or may not define a vortex configuration. Also defined are a pre-heating recirculation zone and a fuel injection and ignition partition, or a partition perforated by a plurality of tubes and acting as conduit, or combustor jets porting into the central core tube combustion zone and into the afterburner section.

The oxidizer (air) flow velocity is increased through these constrictions into low-pressure peripheral, high-pressure central stratified zones conforming within and around the combustion zone. The mean average overall fluid flow rate in these stratified zones is relatively slowed down, while nozzle constricting and increasing the velocity of the central strata and/or core airflow velocity. Fuel is injected into the reduced pressure zones, is ignited and combusted and explosively expands outward and inward of the afterburner section of the core center-body and into the hollow tubular expansion housing to be exhausted through the exhaust nozzle port.

In another variation, the first portion of the airflow intake column forms a central circulation column to supply the requirements of the core turbine engine. The second column of divergent bypass airflow is supercharged over, around and conforming to the central supercharging engine housing and ducting forming an apex or vortex combustion zone. The combustion zone is ported to form an outer stratified layer of airflow in between the constrictions formed in the Ramjet combustion tube or within the constriction conformation of the Ramjet conformation engine. A low pressure peripheral Venturi or Venturi like zone is created into which fuel is injected and inducted into the central high velocity air column to be ignited, combusted and exhausted. The second air column is driven by the core turbine engine attached to and forming the Ramjet inlet conduit housing.

In another form, the turbulence of the combustion process creates a pressure differential. An intense pressure front moves through the combustor zone of the Ramjet engine at or in excess of the speed of sound and reverberates relative to the interior of the combustion chamber in hundred thousandths of a second. It is because of this turbulent repercussive mode of sonic behavior that these engines are referred to as pulse Ramjet engines, and it is through these harmonic surges that added impetus and thrust is obtainable.

The designs of this invention include bulkheads in the housings forward of the combustion zone adding structural elements and/or zones that absorb forward directed pressure more efficiently than may be achieved in engines without such constructs. Furthermore, these bulkheads can be made moveable and act as an echo focusing means by creating standing sound waves (perpendicular shock waves) forming zones of compression-decompression stratification. These relatively stable standing wave zones in the turbulent stratified circulation create recirculation and repercussion processes facilitating fuel and oxidant injection and ignition.

The unit has a supercharging engine, which includes the combined-cycle engine mentioned briefly above.

The present invention provides a gas turbine combustor having a prescribed series of combustion zones rather than standard static or rotating combustion chambers. The inventive combustion zones form high pressure, low pressure stratified zones into which fuel and air is supplied. The fuel is supplied into the combustion zones by a plurality of coaxial fuel injector jets in proximity to an equal number of spark or glow ignition plugs.

A turbine housing case includes a transposable translating high-pressure turbine section and a low-pressure turbine section.

A supercharging pump fan impeller case housing and by-pass conduit ducting are disposed around at least a portion of the turbine case housing and are spaced apart to form a bypass flow passage.

A central hollow drive shaft-cylinder houses the free piston detonation portion of the combined-cycle engine.

A catering injection system furnishes and synchronizes electrical spark, fuel and oxidant to the engine components of the combined-cycle engine.

A continuous flow fuel injection system has nozzles placed upstream and downstream of a combustion mediating hub or clockwise and counter-clockwise relative to the rotational direction of the combustion mediating hub. The nozzles are placed relative to the engine housing and in line with the sparkplugs. The heated compressed air from the compressor section may be maintained above the ignition temperature (flash point) of the oxidizer and fuel mixture. Spark plugs may be necessary only to insure ignition of the fuel and air mixture during cold engine starting and when the unit is in a multi-fuel mode of operation.

The combustion mediating hub moves co-operatively with drive and compressor impellers forward or backward by moving the central drive shaft or by a spline and toggle carriage moved by a toggle extension longitudinally along the drive shaft. Moving the compressor and drive impellers and combustion mediating hub longitudinally forward or aft of the centerline of the fuel injection ports and spark plug deportment ports determines the combustion driving direction and relative ignition "timing". Move the whole impeller/hub arrangement forward of the spark igniter position, and the engine revolves in the forward-determined direction. Likewise, by moving the impeller/hub arrangement backward of the igniters, a reverse rotation direction is produced.

An embodiment includes a reverse (transposed), twisting, channeled screw arrangement, free piston assembly. The central portion of the free piston is slotted, grooved polyhedral or oval in cross section rather than the round cross section that makes up the remainder of the shank of the piston. A drive shaft-cylinder has a matching internal cross section made to accept the external piston cross section configuration. The free piston assembly is arranged central to the turbine housing.

A valve assembly is mounted in the engine. The valve assembly includes a valve inlet, outlet and port arrangement having at least a fluid inlet in fluid communication with a bypass flow passage.

A first fluid exhaust outlet port is in fluid communication with the low-pressure exhaust port and nozzle of the turbine engine and exhausts the gases of detonation.

A second set of outlet exhaust ports is in fluid communication with the exhaust porting means of the turbine engine where, in one arrangement, the free piston acts also as a valve. As such, the drive shaft-cylinder becomes the valve body. The free piston is selectively moveable between an open and a closed position, in which only the first fluid outlet port from the high-pressure fuel pump is in substantial fluid communication with the fluid inlet port built into the drive shaft-cylinder. Thereby, an explosive charge of fuel and oxidizer mixture is supplied into the detonation chamber. The free piston also has within the drive shaft-cylinder an open position, in which the second fluid outlet ports are open to the internal spiraling exhaust ducting system built into the piston and co-operatively leading to the exterior exhaust ports.

In this way, a spiraling helical rotational response to the expanding channeled exiting exhausting gasses is transmitted to the reciprocal motion of the free piston, which is directly co-operatively transferred to the drive shaft-cylinder, thereby also driving the rotating turbine mechanism of the turbine engine. This reciprocal-rotating arrangement incorporates a two cycle internal combustion engine method of intake and exhaust porting, utilizing the free piston and drive shaft-cylinder as a method of incorporating an intake (fuel and oxidant) and exhaust gas valve system.

In one method utilizing a positively displaced injection catering carriage, fuel and oxidant is injected through the intake port of the free piston engine's detonation chamber and detonated, displacing the free piston and the fuel and oxidant injector carriage, opening the exhaust port and exhausting the exhaust gasses. Thereby, the other end of the free piston is displaced into position, and fuel and oxidant are injected within the opposite detonation chamber to be acted upon by detonation. This drives the other end of the free piston and the fuel and oxidant injector carriage back to assume a pre-detonation status. The piston and carriage thus prepare the fuel and oxidant for injection and inject and simultaneously relieve the exhaust, bringing about detonation and repeating the cycle.

The internal lubrication for the turbine bearings is utilized to cool the detonation chambers of the free piston engine.

The free piston engine's cycle involves the use of these responsive high explosive detonation reactions. The oxidant must intermix with the fuel only microseconds prior to detonation to keep them separate and non-explosive. The systems of fuel and oxidant remain separated at all other times within the system to prevent any chance of "flash back" explosions. Fortunately this is accomplished in a simple and straightforward manner using the explosive reaction of detonation to drive solid high speed catering methods of injection that are both self-limiting and transposition checking.

The free piston of the free piston engine is channeled within the confinement of the drive shaft-cylinder so as not to allow any revolving movement except that which is communicated to the revolving drive shaft-cylinder wall. This acts as a piston-valve assembly mounted within the cylinder. The piston interacts cooperatively with the communicating cylinder exhaust and inlet porting of the engine and is in fluid communication with the engine's fuel and oxidant injector catering system and bypass flow passage.

Embodiments can include slave valve assembly systems including fuel and oxidant separate co-operative means that includes a valve body that has an inlet portion in fluid communication with the two different detonation chambers positioned at opposite ends of and within the central shaft cylinder that makes up the housing of the free piston. There are co-operative injector catering valve carriage arrangements disposed in the valve bodies and opened to the detonation chambers made operable by the detonation process. The valve bodies are automatically driven and positioned selectively moveable between a closed position and an open position relative to the position of the free piston and to that of the catering fuel and oxidant injection carriages.

The detonation force of the free piston engine operates the slave catering valve carriage movement, directly or indirectly. All inlet fuel and oxidant ports remain closed and blocked by the interceding position of the catering injection valve carriage, and this situation is not altered until the interceding carriage is put into motion. The carriage is first set into motion by a sequenced injected charge of compressed air or pure oxidant controlled by sequencing valuing methods directly or indirectly and is returned by solenoid, mechanical, pneumatic, hydraulic, or spring loaded means. This movement forces the carriage to deliver its metered intermixing fuel and oxidant charge into the detonation chamber in close approximation to the spark ignition point. The explosive charge directly acts upon the injector piston like carriage to position it to receive the next metered refill charge of fuel and oxidant.

Both the free piston and slave injector and electric spark catering systems are kept in synchronization by controlling the ignition and detonating timing. The rate of detonation responds to and is controlled by controlling the quantity of injected oxidant and fuel. Electric sensing by a magnetic position locator and computing devices (not shown) track the relative positions of the catering carriage injector values to that of the piston, although the harmonic response shared relationship is self-regulating. Contact switch or electric circuit interrupting methods can achieve ignition timing. A computerized method can be utilized to fine tune advancement or retarding processing and the quantity of oxidant and fuel requirements to facilitate optimum engine performance.

In the closed valve position, no fuel and oxidizer outlet port is in substantial fluid communication with the fluid inlet port to supply fuel and oxidizer to the detonation chamber of the free piston engine. In the open position, the detonation chamber inlet valve is open only to the interceding catering injector body. Simultaneously ignition is initiated, activating the responsive reciprocating valve injector catering arrangement directly, actuating the opening and closing of the input ports metering and then injecting the fuel and oxidant. Or, the detonation chamber inlet valve can be so disposed as to create an equal and opposite opening and closing of the fuel and oxidant supply ports, injecting the reactants into the opposite detonation chamber always acting as to intercede, that is, being in the way of the detonation processes and thereby checking any flash back possibility.

The process includes alternately injecting the reactants directly or indirectly into the detonation chambers at the opposite end of the drive-shaft cylinder, closing by intercession those valve-input ports to prevent a flash back into those mixing and detonation chambers and visa versa. Ignition in the opposite detonation chamber commences, producing detonation and returning the free piston and corresponding slave injector catering and valve arrangement to their starting positions to thereby continue the cycle. The whole operation of intermixing or premixing and injection can be reduced to only one injector plunger for each detonation chamber.

A spring, solenoid, pneumatic, hydraulic or mechanical means of operation can be utilized along with a synchronized "inline" high-pressure fuel and oxidant pump (not shown) to the drive the injector catering apparatus. The pressure from the explosion and that of the pressurized fuel and oxidizer, liquid or gaseous, can be utilized so that these sources of high pressure can activate the injector pump operation. A separate pump may be employed to insure filling fluid flow volumetric velocities and bypass return (not shown). After delivering its charge, the injector plunger catering end is left open to the detonation process, allowing it to be in position to harness the energy of the explosion to rebound the valve and plunger injector catering carriage mechanism back into recycling (reloading-recharging) position, much like the action of the bolt action carriage in an automatic rifle.

The inlet and outlet port valves may be cut into the cylinder shaft wall much as those in the cylinder-piston valve arrangement common to the two-cycle internal combustion engine. This allows the exhaust outlet valve timing to be controlled by the reciprocation rate of the free piston in the drive shaft-cylinder, relieving the exhaust only when the exhaust port has been opened by the passage of the piston. The reacting input injector valve catering carriage acts by intercession as a flash back barrier, keeping the input ports closed until the processes of drive and exhaust are completed and only then opening the ports to supply the reactants to the mixing and detonation chambers. This simplifies, strengthens and speeds up the fuel-oxidant catering and injection process.

The free piston engine has a very forgiving timing arrangement in that it does not revolve around top dead center, but unlike a crankshaft timed engine, the time the piston has to remain stopped at "top dead center" is relatively variable. In the compressed state of the impact inertia field of the free piston, the mixed fuel and oxidant has its own time to bring about the processes of detonation with a supportive electric spark charge. This in turn makes the reaction faster, more complete and more efficient.

Nevertheless, there has to be a built in shock absorber. Here, it has been built into the piston screw faces, even though the expanding gases create a detonation shock wave that becomes "crushed and tortured out of existence" or smothered by the relatively slow reaction time of the piston. It is this smothering or muffling effect (that is in part due to the tortured venting inherent in the piston screw face designs) upon the hypersonic detonation waves that act to silence the destructive aspect of these processes and effect efficient high velocity operation. The screw like piston's "flow restriction" shape provides fluted, beveled, spin direction channeling, so the high velocity exhaust gases act as their own muffler like built in shock absorber.

Further, it is through the convoluted spiraling screw channel course provided the exhaust by the free piston porting means and through which the expanding exhaust gasses must transverse that acts to force the free piston's reciprocating and rotating spin orientated driving response. Due to the acute angles of the faces of the piston and the conical space allotted the detonation chambers, along with the almost square area of the highly compressed explosive mixture, the displacement by detonation is calculated as a cubic volume in exponential proportions. Fortunately, the realized volume representing displacement and thereby representing work done by the expanding gasses of detonation is able to be relieved in likewise exponential (cubic) proportions.

High altitude supercharging of ambient air into the Venturi induced low-pressure laminate air/fuel mixing zone of the Ramjet engine increases its operational range due to reduced external air friction losses and an increased internal-to-external pressure differential. Maintaining an airflow mass inertial velocity within the Ramjet combustion tube where its associated forward response pressure differential is provides the only means of propelling it. At the same altitude, non-supercharged Ramjet-tube engines become inoperable.

In the high upper atmosphere the air becomes so thin that the Ramjet combustion processes cannot function, so embodiments of the present invention add supercharging processes. The addition of less than twice the weight in fuel and/or oxidant results in more than twice the work (range) at greater velocities due to increases in efficiency, while continuing to operate at very high altitudes. Furthermore, an increase in efficiency can be attributed to up to a 90 to 99 percent stoichiometric exhaust.

This result is due to the stratified fuel and airflow turbulence creating a more controlled mixture of air and fuel that allows a richer, more ignitable mixture at the points of ignition while retaining complete overall combustion. Too many centrifugal swirls added to the air stream and not enough turbulence, and the stratified layers of air and fuel are not easily mixed. In prior art technology, a diffusion combustion system can have a problem of high level NOx. Premix combustion systems also have problems of combustion stability, such as flash back, and flame stabilization during the start up and partial or overloaded operation. In actual operation it is preferable to simultaneously solve these problems.

The Venturi phenomena promote and mediate the stratification effect. Furthermore, due to the Venturi effect, the friction and heat losses to the combustor walls of the Ramjet engine are reduced. The combustor walls may be perforated to facilitate cooling. These losses go up by more than a square dimension (logarithmic) as the combustor length to width ratio is increased. A one to one or square dimension is considered the "classic" length to width ratio of Venturi tubes. Efficiency is attributed as being inversely proportional to the velocity of the residual expanding exhaust, and the exhaust velocity should, ideally, be reduced toward zero relative to that of the ambient air.

Reducing average internal flow rate velocities by the more efficient conversion of external velocity flow vectors into internal fluid gas convergent compression fields and thereby increasing the overall pressure differentials and subsequent drive efficiencies operate to reduce the residual exhaust velocities and increase forward propulsion and overall performance. Stratified swirling turbulent air within the combustion zone and the premixing chambers need to be tuned so that the dense fuel rich compression wave zones reach a spike or peak at the points of ignition and still reach stoichiometric conditions at the exhaust (that is, without unburned hydrocarbons or NOx). There is provision for the proper tuning of these chambers and zones and for adjusting the lengths of the combustion chambers of the Ramjet engine. Proper tuning of Ramjet engines also helps silence them.

In another aspect of embodiments of the invention, the combined-cycle engine is considered as an integrated part of the unit concept. Within the turbine there is a central drive shaft-cylinder containing the oxygen charged percussion-detonation driven free-piston component of the combined-cycle engine.

The combined-cycle engine realizes benefits derived from the contra rotating interfacing turbine vane arrangement other than reversibility. The fact of the very high apparent closing velocity of the contra rotating turbine blades means that the speed at the apex of the interfacing blades becomes that of a diagonal cross section as it moves outward. Thereby the speed of sound preceding ignition (a desirable characteristic in these engines) can be obtained directly and at less revolutions of each set of the interfacing oppositely rotating compressor vanes compared to those of standard turbojet engine designs such as that shown in FIG. 11. A shock wave is created and moves relative to the converging apex outward toward the ignition points. This shock wave causes a micro-sonic boom to echo off the peripheral engine-casing walls, inward then against the outward centrifugal driven compression gases, further shock compressing them into a stabilized zone into which fuel is injected and focused convergent toward the ignition points.

The convergence of these elements creates a stabilized point of greater pressure and temperature where the sonic echo is focused toward the points of ignition. Thereby, much of the disruptive attributes of supersonic air shock wave and flow velocity effects are converted into desirable processes, further increasing the compression of the shocked and nearly stopped, impinged and highly tortured, superheated localized air stream and creating corresponding ignition point stabilization and enhanced flame-front propagation.

Accordingly, ideal points for the fuel injection of rich stratified fuel air mixtures are created. These rich mixture strata enhance ignition due to the lower ignition temperature of the richer mixture, averaging a lower temperature of combustion while providing the overall heat of combustion required to insure the combustion of the adjacent leaner fuel air strata. These attributes then constitute the means of improved ignition and combustion performance by lowering the "heat of ignition" requirements and at the same time producing a higher internal pressure differential at overall lower operating temperatures. This aids in the elimination of "hot spots" and the associated NOx, assuring more complete combustion and a correspondent forward propulsion momentum at a reduced exhaust flow velocity and detectable heat signature at the exhaust port.

These attributes and characteristics acting as a unit and in concert constitute the unique combined-cycle engine supplemental supercharging of the Ramjet engines described herein. They offer, from the matching of these complimentary engines and cycling processes, a vista of efficient far-ranging highflying new accomplishments in engine design and development. The supercharged Ramjet engine can begin operation at from 300 to 400 miles an hour or less to the operational range of the Brayton or Okamoto cycle rocket/ramjet hybrid engines and the scramjet at 9.6 Mach while obtaining greater range of operation and velocity when operating at high altitudes. Quiet operation, greater performance and range and optional reversibility, marked by a cleaner, cooler exhaust, becomes the hallmark of the efficiency and applicability of the unit concept.

It should be understood that the detailed description and specific examples, while indicating certain embodiments of the invention, are intended for purposes of illustration only and are not intended to limit the scope of this invention.

BRIEF DESCRIPTION OF THE DRAWINGS

Additional advantages and features of the present invention become apparent from the description and the claims, taken in conjunction with the drawings, where like elements are referred to by like numbers throughout the drawings.

FIG. 11 is a schematic drawing of a state of the art "combined-cycle" bypass turbo-jet engine ramjet conformation engine.

FIGS. 12A to 12C are schematic drawings in accordance with the teaching of the present invention representing particular examples of packaging the engines referred to into a particular application.

DETAILED DESCRIPTION

Units of unique engine modalities, and/or modules, consisting of a series of three or more aircraft engines of novel types are described herein. Each unique engine or engine combination or conformation, acting independently or together, presents an advancement in the state of the art, and the engines acting in concert represent an improvement in the performance of the specifically derived attributes. The unit modules are made up of a combination of components consisting of specific engines and the means to connect or separate them into particular operational parts and supportive structures.

Generally, a Ramjet engine is augmented ("supercharged" air induction) by an ambient atmosphere aspirated combustion-cycle "counter-rotation" turbine fan-jet engine. This combined-cycle engine can be referred to as an equal and opposite acting turbine fan-jet engine, and it is nearly instantly reversible. The combined-cycle engine can include an internal central free-piston detonation-cycle engine within its hollow drive shaft 41 that utilizes a self-contained supply of oxidant and fuel (carbohydrate or hydrocarbon or hydrogen).

Figure 1:
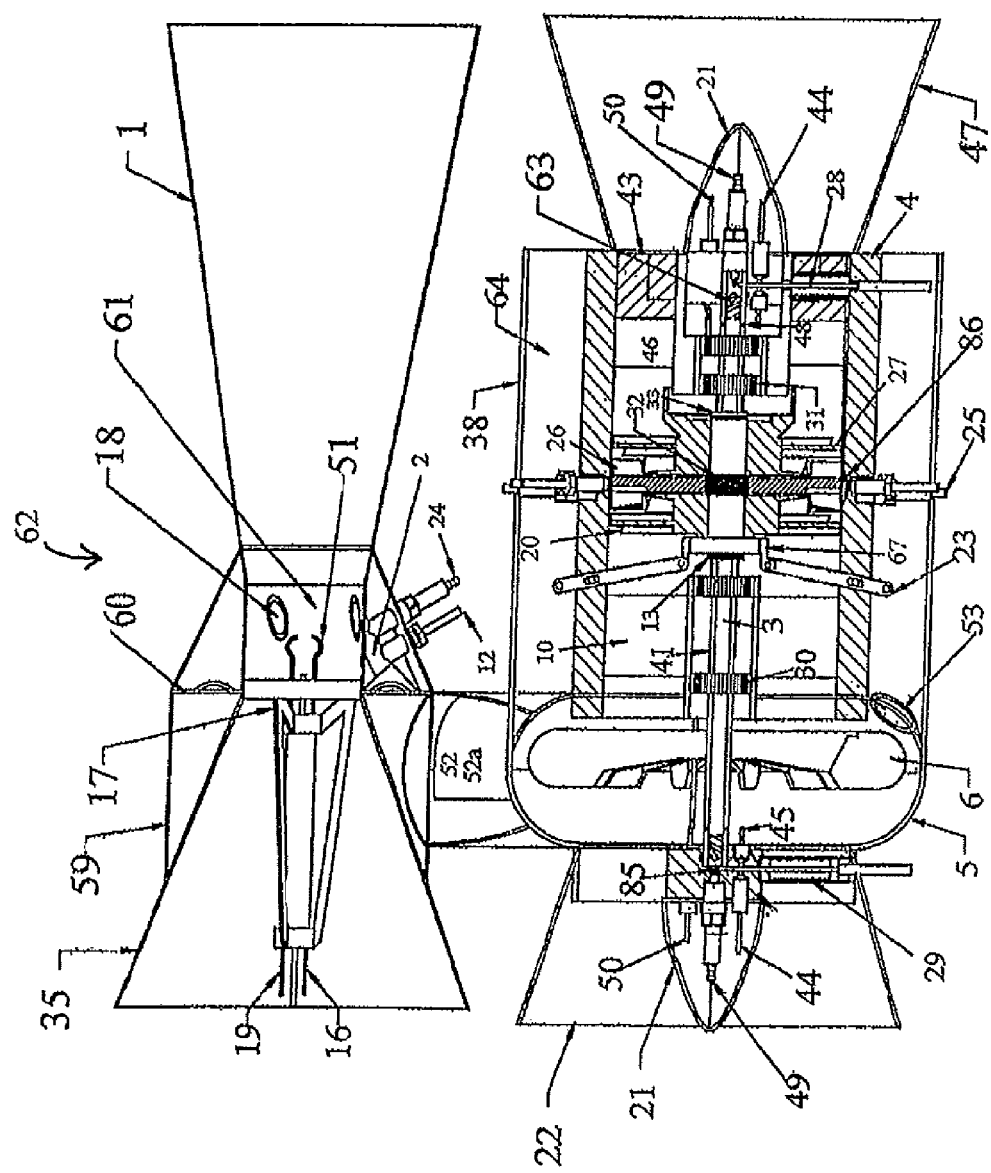
FIG. 1 is a partial cutaway, partial cross-sectional side view of one unit of engine configurations in accordance with the teachings of the present invention.
Figure 2:
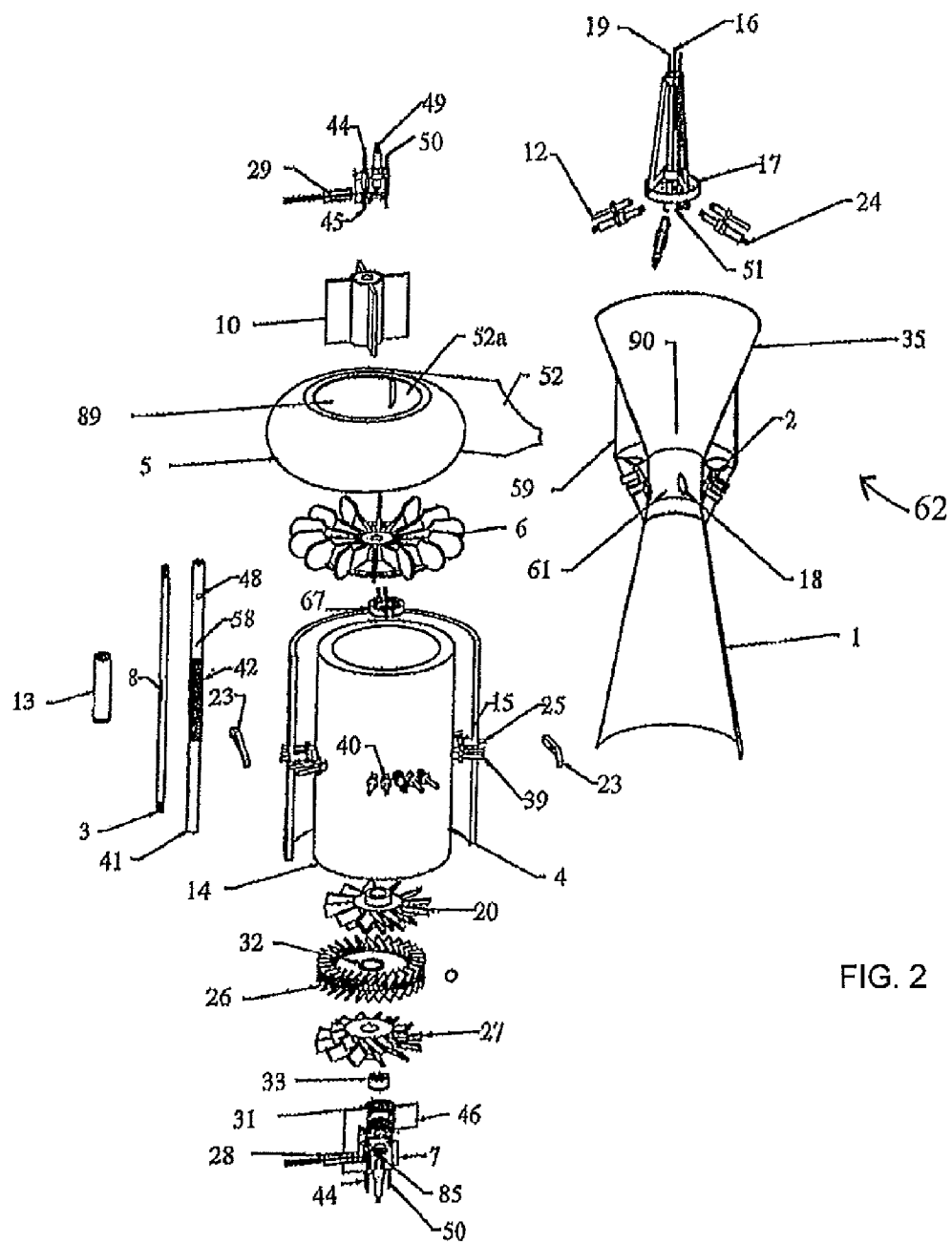
FIG. 2 is an exploded illustration of the unit of engines and mechanisms of FIG.

Referring initially to FIGS. 1 and 2, the Ramjet or jet-tube engine 62, often simply called a J-tube, consists basically of a tube forming a combustion zone 61. The Ramjet engine is also generally referred to as a tube herein.

As described in additional detail herein, the tube 62 is fitted with appropriately placed fuel injection nozzles or fuel input tubes 12 and ignition means (glow or spark plugs) 24 and forms an interior volume into which fuel is injected and the fuel and oxidizer become mixed. Upon ignition and combustion, the tube 62 is converted into a jet tube. The openings at either end of the tube 62 (e.g., variable geometry intake air cowling 35 and variable expansion exhaust cowling 1) act as inlet and exhaust ports and other appropriate ports may be added as required by this invention. As shown in FIG. 1, for example, one such added port consists of a jut-opposed tangent conduit tube or turbine engine supercharger air bypass conduit connection 52, which also acts as a supportive brace connecting the Ramjet engine 62 to the impeller fan driven oxidant pump (supercharger) 6 of the combined-cycle engine that is discussed in more detail hereinafter.

The Ramjet engine 62 may utilize a means of being detached or retained as a part of the unit core structure and may utilize adaptations designed into configurations that are best represented by the Venturi or Botanelle effect. That is, a constriction in the wall of the tube 62 conducts air and produces a stratified central zone or column 90 of high velocity air and a low-pressure and velocity peripheral, laminar air zone into which exterior peripheral air or other fluid is introduced.

The constriction may also be produced by a body located in the center of the tube 62, creating the stratified relatively low-pressure, low flow velocity zone of laminate turbulent air adjacent to the tube wall constriction and the surface of the constricting center-body. Fuel and supercharged air are injected and mixed in this zone. This mixture is mixed with the higher relative velocity and pressure of the stratified central air column and is ignited thereby converted into the even higher temperature, pressure and velocity of the deflagration process. The pre-mixed fuel and thermal conditioned air explodes and forcefully achieves pressures and deflagration velocities. This causes shock flash-back compressive pulsation that brings about the stopping of the in-rushing air flow, producing stabilized static pressure into which fuel is injected, ignited and thereby driving the compression and expansion processes within the tube 62.

The pulsating explosions within the Ramjet engine 62 are ejected outward and backward toward the exhaust cowling 1 due to the in-rushing air mass and the relatively forward positioned constriction. This creates a response reaction within the Ramjet engine 62, forcefully driving the engine and the aircraft forward while producing counter mass exhaust ejecta.

The forward component of the explosion checks the onrushing Ram inducted air, momentarily stopping it, compressing it, subjecting it to convection and radiant heating and shocking it. This produces an ideal stabilized ignition and fuel injection zone (combustion zone 61) into which the fuel injectors 12 and spark or glow plugs 24 have been placed. The resulting fuel and air ignition and combustion thereby produce hypersonic explosive forward propelling drive. The cool onrushing Ram induced air could super-cool and quench the combustion processes. Therefore, a method of reducing the amount of Ram air induction with a divergent cone shaped cowling to maintain a stabilized static pressure rise within the combustion zone 61 is included. Conversely, at high velocities and high altitudes where the air is rarefied and super cold, a selective method of convergent means has been devised to collect and preheat the required volumes of the air propelling and oxidizing medium.

When the term "mixing" is used relative to fuel and air and/or oxygen mixtures, it will be understood to include atomization and vaporization unless the fuel is injected in the gaseous state.

Figure 3:
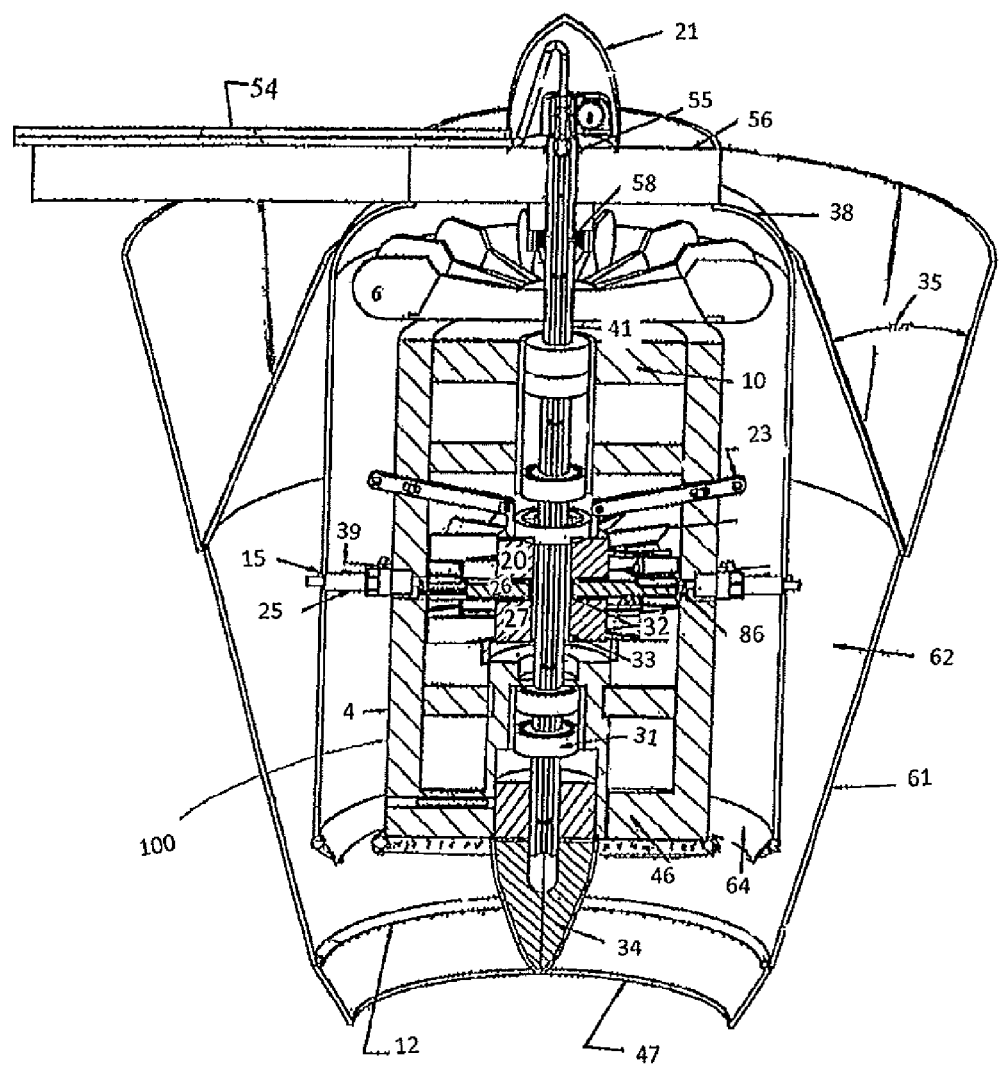
FIG. 3 is a partial cutaway, partial cross-sectional view of an embodiment of a Ramjet conformation engine unit.

Pertaining to the knowledge of the workings of Venturi tubes, low-pressure, low velocity and high pressure, high velocity differential regions can be produced within any straight tubes when they move through a fluid medium such as air. This stratification of pressure zones is due to the nature of airwaves, which when confined within a tube constriction produce first a standing wave high-pressure/velocity air zone followed by a standing wave low-pressure/velocity air zone without the need for other constrictions in the tubes. This is to say that almost any such straight tube may be used herein. In another variation, other Venturi like stratified airflow zones are produced within the restricted confined conformation conduit surrounding a central core-body housing that may contain a unique supercharging turbine fan-jet engine as taught herein. See, for example, FIG. 3, where the partial cutaway, partial cross-sectional view shows the central core-body housing 38 acting as the constriction in the Venturi like configuration, creating first a divergent air stream then a supercharge driven stratified Venturi like convergent air compressing apex or vortex zone or zones aft of the constricting center body conformation so as to form heated, confined and stabilized combustion zones. This arrangement is referred to as a Ramjet conformation engine. (See also FIGS. 10A and 10H). In FIG. 3, the turbine engine 100 differs from that described in detail hereinafter with respect to FIGS. 1, 2, 4, 6 and 9 as it does not include a free piston engine. FIG. 3, however, shows different components to support the structure of its embodiment including a liquid coolant and lubricant tube connector 54, conformation turbine engine lubricant and coolant fluid o-ring seals 55, conformation engine bearing brace support 56 and insulated housing cover 34.

The standing differential pressure waves produced within these Ramjet engines can be supercharge driven and made to swirl or otherwise spin simply by controlling the angle of convergence of the air pressure differential zones. Many methods of directing this convergent airflow are well understood by those knowledgeable in the art. Vanes, blades, flaps, steps, partitions or the asymmetric placement of a restricting centerbody can be used to direct the airflow into an apex, vortex or otherwise stratified conformation and can be made to be variable so that the airflow itself can be made to produce the desired effects. Proper fuel distribution within the zones of high and low-pressure air stratification can act to improve ignition and promote the complete combustion of fuel and oxidizer. In certain forms shown by example in FIGS. 10B and 10C, a forward positioned offset peripheral partition wall perforated by flow directing tubes control co-operatively convection recirculation and Venturi convergent fuel injection intermixing airflow stratified zones.

Adequately and efficiently heating the overall volume of air and fuel prior to combustion is required. This allows the engines to accept an additional surge of cool, supercharged ultra lean air-fuel mixture by a discreet two-stage fuel and air and (optional) pure oxygen injection procedure. The air/fuel mixture temperatures and densities are raised by convergent compression and the compression of supercharging without inducing flame flash back, preventing flame out and assuring the heat of combustion energy required to complete combustion in the adjacent stratified shear layers. This in turn further accelerates the flame front toward hypersonic velocities, accelerating the velocity of the whole combustion process and thereby increasing the obtainable acceleration of the aircraft by promoting complete fuel combustion, reducing exhaust temperature and decreasing the exhaust velocity per unit of forward thrust.

In this way, engines taught herein increase engine performance and efficiency, reduce the required combustor preheating energy component per unit of combustion heating, promote and produce more forward thrust, reduce exhaust velocity and waste heat per unit of forward thrust, reduce exhaust pollution and avoid engine flame out.

Preventing instabilities, hot spot produced NOx and thermal imprint signature, poor thermal distribution, undesirable shock waves and minimizing total pressure losses are done. The described engines enable reductions in the length to diameter ratio of the combustion zone of the Ramjet engine by reducing heat and friction loss to the walls of the combustion zone. (Friction and heat losses increase with combustor length and additional workload requirements in algorithmic, exponential increments.) Internal insulation and the resultant reduction of heat and friction losses to the combustor walls are achieved, due in part to the Venturi effect (and reduced combustor length), through the thermal and friction blanketing by the interceding strata of thin, lower velocity, relatively cool laminate inducted air.

The Venturi effect also automatically controls the differential negative pressure created surrounding the convergent central Venturi dynamic airflow stream. An increase in the central core airflow velocity within the interior of a Venturi like conformation restriction or tube construct automatically produces an increase in the peripheral laminate sheer layer's relative negative air-pressure, slowing down its turbulent velocity. This automatically increases the efficient acceptance of the additional cool supercharged air into the surrounding strata of convergent airflow rates, fuel induction injection and concomitant intermixing rates and diminishes the stratification of the air stream. An interfusing zone is produced facilitating radiant heating and convection intermixing of fuel and air, thereby allowing the combustion zone 61 to be designed relatively shorter (to achieve an optimum efficient cross-section profile). This makes available a precisely controlled low-pressure recirculation (vestibule) zone for fuel and air injection and mixing and radiant preheat and heating of the inducted cool combustion air-fuel mixture (thermal pre-conditioning). Benefits of the Venturi and Venturi like effects as applied to the performance of the Ramjet engine within the modem-unit concept are reliability, simplicity, controlled high combustion efficiency, wide flammability and high specific thrust performance over a greater range of operation.

The unique "gyroscopic, contra rotating, counter gyration" turbine fan-jet engine component of this invention utilizes a hub and radiating vane arrangement (shown as compressor impeller 20, combustion mediating hub 26 and drive impeller 27 in FIGS. 1, 2 and 3) that acts to centrifugally compress incoming differential pressure induced air. Forcing this air into a reduced space 86 produces high pressure and temperature within this space 86 and thereby defines an aspect of the turbine engine's pre-combustion zone. The space between air and fuel is reduced to a proper ratio of temperature and pressure required to initiate and maintain combustion without the need for the standard static combustion chamber expansion and combustion containment vessels (combustor) or static deflector vanes of FIG. 11 to insure combustion throughout the range of operation.

The high pressure of this combustion interacts directly with the vanes of the drive impeller 27 and the vanes of a freely revolving oppositely rotating combustion mediating hub 26, which acts to separate the compressor pressure zone from the combustion pressure zones. Driving them both by deflection in opposite directions, with the mediating hub 26 free to be driven differentially, automatically equalizes the driven loads. (See also FIGS. 4 and 5). As shown in FIGS. 1-3 and 5, the combustion mediating hub 26 can be driven differently due to the inclusion of a lubrication trace and bearing retainer 32 housing bearing 33. The drive impeller 27 is fixed to the compressor impeller 20 through commonly shared drive shaft 41 best seen in FIGS. 2 and 3.

Referring to FIG. 11, standard state of the art turbine and turbo-jet engines have intervening static or rotating combustor arrangements 111 that absorb the high heat of combustion within their combustion containment walls. This greatly restricts their pressure containment capacity, meaning they are partial to blowing apart under the pressures obtainable from the blast and heat energy of the exploding fuel. They produce heat and friction losses before there is any driving gaseous interaction, greatly restricting their design parameters.

The free-piston detonation (combustion) cycle engine (collectively shown as fuel and oxidant injector carriage 28, injector covering 29, turbine engine drive shaft and free piston engine cylinder 41, free piston 3, free piston engine exhaust port 48 and free piston engine spark plug igniter 49) aspect of this modern concept utilizes a separate (from ambient air) chemically constituted or compressed oxidant and containment tank. This allows the engine to be operated separately and separate of ambient atmospheric conditions, as a booster engine for operation under overload and high altitude conditions as well as acting in part as a starting engine for the turbine aspect of the co-operatively functioning engine combination.

The unique combined-cycle engine with a composite series of oppositely rotating, double acting stages of counter-gyration, forming a supercharging fan-jet turbine engine, and the Ramjet engine operate as a unit. The unit has the ability to operate under overload and reduced velocity and in air too thin for the operation of other types of engine combinations (except the pure rocket engine or rocket/ramjet scramjet hybrid complexes). It also removes the requirement of rocket engines to carry the considerable weight of the additional oxidant, along with (as required) that of the heavy pressurized oxidant tanks, except for the use of (as required) the free piston engine component. Such modular units carry with them a great potential to transverse the farthest reaches of the stratosphere and the near reaches of space.

Figure 4:
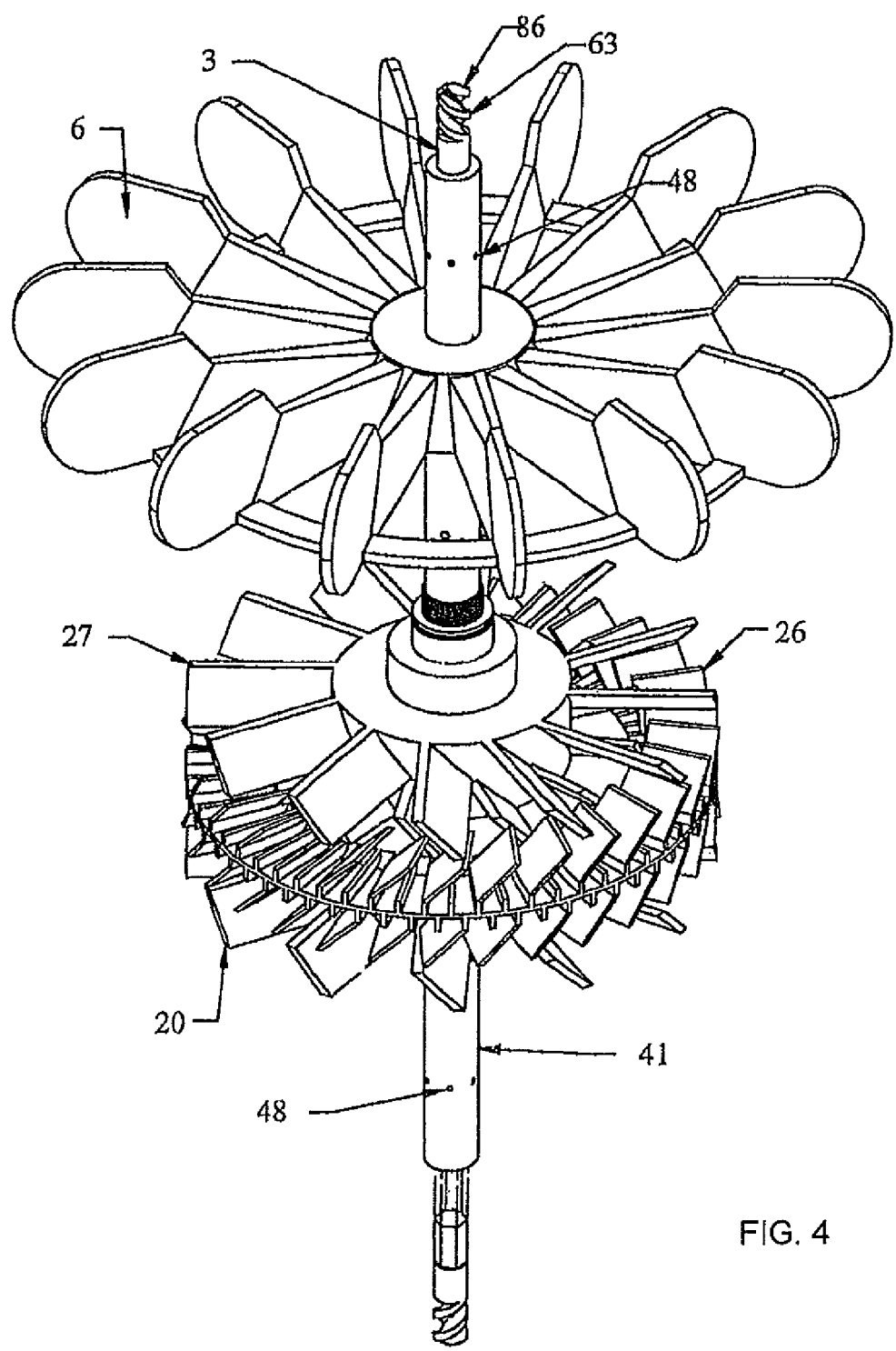
FIG. 4 is a perspective view of the turbine engine compression and drive impellers and drive shaft according to FIG. 2.
Figure 5:
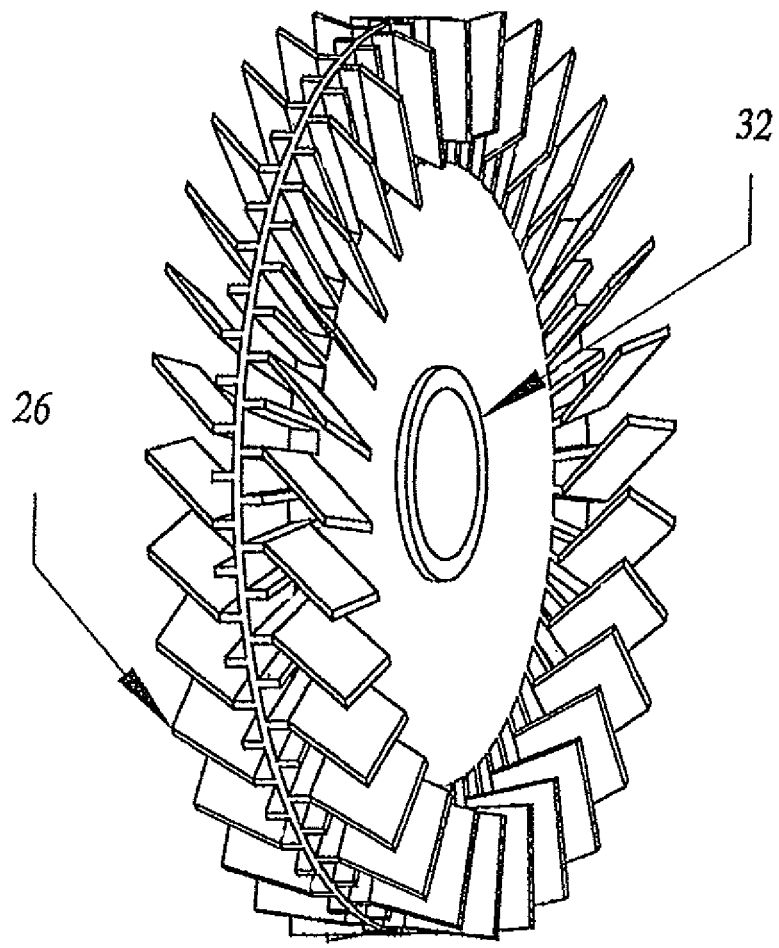
FIG. 5 is a perspective view of the combustion mediating hub according to FIG. 2.

As shown in FIGS. 4, 5, the unique combined-cycle, oppositely rotating fan-jet turbine engine supercharging air pump consists of rotating turbine impellers 27 and 20 fixed to a common drive shaft 41 within the engine's housing. Drive impeller 27 and compressor impeller 20 are separated by a specially designed (inset, offset, parallel, juxtaposed vane configuration) free contra-rotating, interfacing, combustion mediating hub 26. They are all fitted to the drive shaft 41 in a manner that allows the freely rotating combustion mediating hub 26 to rotate, driven in a reverse direction from that of the compressor and drive impellers 20, 27. This is achieved through the built-in transposed symmetry/asymmetry, mirror image of the vane configuration arrangement shown in FIG. 5. The impellers 20, 27 and hub 26 interact co-operatively to drive the impeller centrifugal fan type supercharging air pump aspect of the combined-cycle engine (hereinafter impeller 6), which in turn furnishes a tangent by-pass stream 52 of supercharged air to the Ramjet engine and the bypass air required to cool all the engines and operate the afterburners as shown in FIG. 2. The impeller 6 is capable of furnishing these air streams adequately and in opposite directions.

In this invention, airflow velocities momentarily approximate zero within the combined-cycle turbine engine's uniquely conformed compressor space 86, relative to the velocity of the aircraft. This creates an increase in the rotational velocity limit for the compressor vane travel, especially at high altitudes and velocities relative to the apparent closing velocity of the compressor vanes and those of the contra-rotating combustion mediating hub 26. The vanes are not as subject to the distress of shock events because of counter-harmonic cancellation and interference phenomena that create improved compression. Instead of disruptive attributes, the convergent effect of the compressor vanes result in gaining advantages from shock induced effects. A localized and stabilized ignition point created by the shock induced counter-checking of the air-flow approaches a zero point or zone. These shock induced airflow processes actually accentuate the efficiency of the thermal and compression processes, insuring a stabilized zone of compression and the adequate localized heat of ignition. Further, the placement of the static combustor elements within the standard engine, such as that in FIG. 11, is not conducive to cooling the peripheral zone of the combustor elements, further severely limiting design parameters. That is, they create an insufficient method and means of internal heat transfer and a shock induced thermal dislocation of the heat of ignition at the ignition points, often due to an induced high velocity cold air stream overwhelming and quenching flame propagation and killing the engine. (These speeds are accumulative or additive and relative to each other, the aircraft, the air and the ground.) Engines with stationary combustion chamber bulkheads maintain combustor average internal forward velocity values relative to the aircraft's fuselage velocity, and are always fixed one to the other.

In the case of the combined-cycle engine taught herein, the combustion mediating hub 26 vanes and drive impeller 27 vanes act to absorb the momentum of the forward and lateral thrust velocity vectors of combustion directly. Consequently these forces are converted directly by deflection, and thereby more efficiently, into separate lateral rotational vectors as well as forward directed vectors. They are converted from what would normally be backward directed lost inertia or friction drag, without the need for intervening static or rotating combustion containment vessels, or other static deflecting, channeling, compressing, flow directing or compacting vanes as required by the structure of FIG. 11. Static elements placed in the path of a high velocity, high-pressure air stream usually simply create obstructions toward forward impetus or lateral driving processes. Therefore there is advantage in eliminating as many of these obstructive elements as possible.

The explosive drive is directed to the contra-rotation of both the combustion mediating hub 26 vanes and drive impeller 27 vanes without a need for the intervening standard static or rotating combustion chambers, thereby increasing impeller drive efficiency and decreasing space, heat, friction and weight requirements. The combustion mediating hub's inset, parallel, offset, juxtaposed (jut-positioned) vanes as shown in FIG. 5 produce an apparent closing velocity that is many times more than the average velocity of the compression gases.

The production of an apparent wedging fluid flow indexed velocity that moves diagonally and outward relative to the established closing velocity of the contra rotating vanes of the compressor impeller 20 and the combustion mediating hub 26 greatly exceeds the velocity of the overall fluid flow rate, which becomes reduced toward zero. The combustion mediating hub 26 with its vane type flow directing insets focuses these fluid flow rate vectors into fluid compression fields. The high relative rate of the compressor impeller 20 (or drive impeller 27) and combustion mediating hub 26 vane tip closing velocities increases the effective compression rate, thereby building up more of the internalized heat of compression. Efficiently pre-heating and compressing the cool inducted air increases the intermixing chemical reaction rate, capability and capacity potential, and decreases the chemical reaction time, decreasing the fuel and air mixture's required ignition temperature. This increases the overall post-combustion expansion and cooling processes and thereby increases the peak achievable rate and velocity of the combustion reaction. In this way, the propulsive potential of the engine is increased.

What is most remarkable is the fact that the velocity of the interacting fluid flow rate is reduced from tangent lateral flow vectors into nearly fixed compressive flow fields. Further, the impinging back pressure exerted by the back scattering oppositely (forward) directed explosive shock wave created by the combustion front completely counters (checks) the backward directed incoming compressed air flow. This air flow counteracts the disruptive attributes of these shock waves, converting them into very effective compression, thermal (heat) and flow (checking) directing force vectors, further reducing the overall volume of air by this means of shock wave compression into nearly fixed field points. These ignition "points" are where the volume's temperature and pressure becomes ideal for efficient ignition and deflagration expansion processes. A localized zone is created where fuel and oxygen reach proper stoichiometric ratios, and the flame temperature approaches adiabatic flame temperature, thereby increasing the efficiency of the reaction by reducing the time required of these processes and gaining localized flame retention stability and a cooler overall operating temperature, with concomitant flameout prevention capability.

The total lateral fluid flow rate approximates zero as the two converging interfacing contra-rotating sets of vanes squeeze and compress the inducted gases into a space 86 convergent toward zero (the "ideal" ignition point) where fuel injection orifices 40 and ignition electrode elements (i.e., glow or spark plugs 25) are located. This highly compressed superheated air is "spun out" in the direction of rotation of the combustion mediating hub 26, into the equal and opposite rotating drive impeller 27 vanes to come to a relative stop. Fuel is injected and ignited within the constricted space 86 created between the rim of the combustion mediating hub 26 and the interior engine housing 4 (into which fluid flow directing channels have been cut). The flow is created by the turbulent interaction of the inertia of the gasses and the heat of friction produced by the velocity of the rotation of the rim of the combustion mediating hub 26, along with the heat and the pressure of the centrifugal compressed gas-flow rate, is successfully checked by the back-scattering pressure of the combustion wave shock front. This creates stabilized turbulent compressing, heating and mixing conditions and an ideal point into which fuel is injected and intimately mix with the oxidant.

Through initiated combustion, the process of expansion and the inertia of the gases, driven by the high pressure highly compressed super heated burning gasses of combustion moves around and away from the rim of the combustion mediating hub 26 and into the adjacent, relatively reduced pressure of the combustion field. The combustion field is created within the space between the after face of the combustion mediating hub 26 vanes and the vanes of the oppositely rotating drive impeller 27 and the engine's internal housing walls 4. The combustion process continues and further expansion occurs and acts directly upon and drives both sets of vanes of the oppositely rotating drive impeller 27 and combustion meditating hub 26.

The ignition electrode points need not be located at precisely "top dead center" relative to the ideal ignition point. "Timing" of the engine is achieved through a selective axial, longitudinal movement of the combustion mediating hub 26 relative to the fuel injection orifices and ignition electrode points. This can be done by moving the whole drive shaft 41 and impellers 20, 27 along with the combustion mediating hub 26, or through a separate carriage and toggle movable arrangement of the impeller hubs. Such movement is "upstream or downstream" and "forward or aft" longitudinally and axial relative to the location of the ignition electrode points, thereby locating "top dead center". That is, "top dead center" is defined by the point where the outer diameter (rim) of the combustion-mediating hub 26 is selectively positioned to be in nearest proximity to the ignition electrodes 25 and inline with the fuel injection orifices 40.

Such positioning of the combustion mediating hub 26 relative to "top dead center" is used to bring about engine reversal. This arrangement is rather like creating positive displacement engine backfiring by ignition advancement or retardation relative to top dead center by moving the drive shaft or toggle carriage arrangement into the "aft" position and thereby moving the proximity of the rim of the combustion mediating hub 26 "aft" relative to the ignition electrodes 25 and fuel injection orifices 40. Reversing the direction of rotation of the drive impeller 27 by causing combustion to occur "forward" in the compression zone causes the drive impeller 27 then to act as the compressor impeller 20 and the compressor impeller 20 to act as the driving impeller. This driving of the compressor impeller 20 (now acting as the driving impeller) in the opposite direction is due to the disposition of the relative opposite set angle of the transposed propulsion vanes on the combustion mediating hub 26 and those of the drive impeller 27.

Likewise the position of the fuel injection orifices 40 is such that fuel may be selectively switch transposed into a reversed (counter-rotational direction) fuel injection orifice's positional alignment relative to the ignition point. Thus, even though the impeller rotation direction has been reversed, the fuel is always injected upstream of the rotational direction of the rim of the combustion mediating hub 26, convergent downstream toward the ignition electrodes 25. (The igniters may be required only during cold starting procedures—at the "ignition" temperature of the fuel, ignition can be induced at the fuel injection ports.) The combustion mediating hub 26 and drive impeller 27 and the impeller 20 of the compressor stage are driven directly in such a manner as to be diametrically interfacing one another but causing a reversing of the rotation direction of the drive shaft 41. This occurs automatically, thereby eliminating many of the dimensional, thermal and friction liabilities inherent in the construction of the standard static combustor arraignments that are not amiable to the reversal procedure. This therefore eliminates the need for the added weight, space, expense and efficiency losses inherent in such designs that do not allow for the reversal characteristic inherent to this engine design configuration.

Selective switch transposed compressed oxygen injecting jets (i.e., oxygen injector input tubes 15 and oxygen injector port connectors 39) are fabricated upstream and inline with the fuel injection orifices 40 and the ignition electrodes 25, which can then supply additional oxygen to the engine. This furnishes an explosive charge means of starting the turbine engine and boosting and sustaining its operation in overloaded or high altitude circumstances and maintaining a stoichiometric mixture.

An electric starting motor or other auxiliary engine or starting motor and generator arrangement (not shown) can be attached directly or indirectly to the turbine engine drive shaft 41. Being placed forward of the air intake position would supply (as necessary) the initial rpm velocity and the required inertial impetus and air compression to begin the operation of the engine and furnish any electrical requirements. When arranged in such a combination, the explosive charge detonation rotary-reciprocating drive of the free piston engine component of the combined-cycle engine is more than adequate to furnish the starting impetus necessary to begin to run the turbine engine aspect of the combined-cycle engine. A synchronized charge of the pressurized oxygen or compressed air and timed electrical spark are required to furnish the initial explosive impetus to start the free piston engine component.

FIGS. 10A-10J illustrate a number of schematic type diagrams depicting alternative engine conformations designed in accordance with the teachings and embodiments of the present invention.

Figure 10E:
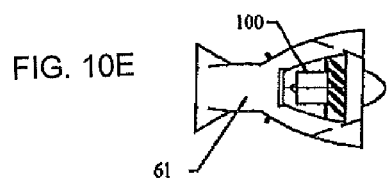
FIGS. 10A-10J illustrate a number of schematic type diagrams depicting alternative engine conformations designed in accordance with the teachings and embodiments of the present invention.
Figure 10A:
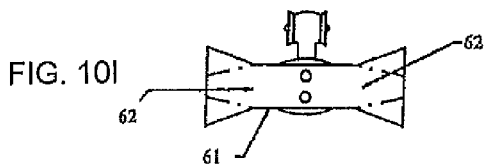

FIG. 10A is a schematic drawing of a variation embodiment of an apex Ramjet engine component 62 of the engine unit that illustrates two selective positions in the combustion tube length producing a supercharged dynamic airflow velocity amplification by the selective "tuning" of the combustion tube variable length within the combustion zone, also called a dump step vestibule apex combustion (afterburner) chamber 61 of the Ramjet engine.

Figure 10G:
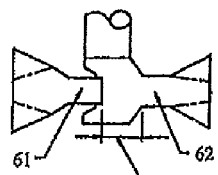
Figure 10B:
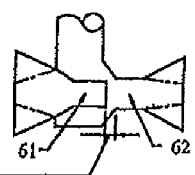

FIG. 10B is a schematic drawing of another embodiment of an apex Ramjet engine component of the engine unit illustrating a three-stage (Venturi induction amplification) airflow rate supercharging dynamic conformation.

Figure 10H:
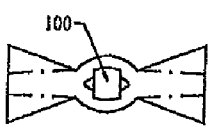
Figure 10C:
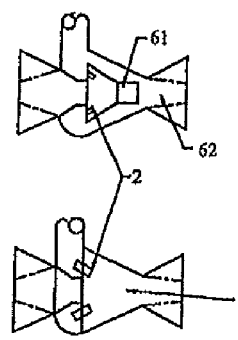

FIG. 10C is a schematic drawing of an embodiment of a two-staged variant "Venturi amplification" airflow rate supercharging dynamic apex Ramjet engine conformation.

Figure 10I:
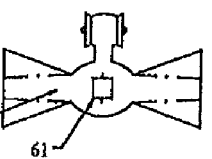
Figure 10F:
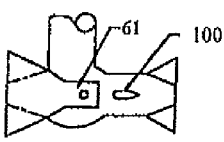
Figure 10J:
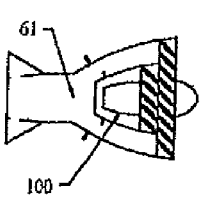
Figure 10D:
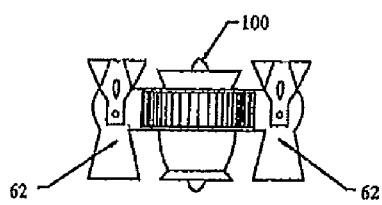

FIG. 10D is a schematic drawing of an embodiment of two offset apex Ramjet engines combined together with one combined-cycle supercharging fan-jet turbine engine and may be designed to accommodate the addition of more.

FIG. 10E is a schematic drawing of an embodiment of a combined cycle supercharging fan-jet turbine engine and Ramjet conformation engine combination.

FIG. 10F is a schematic drawing of the embodiment of a dump step mediated supercharged (Venturi induction amplified) airflow dynamic Ramjet engine component of an engine unit complex.

FIG. 10G is a schematic drawing of the embodiment of a symmetrically reversible combined-cycle turbine Ramjet engine-conformation engine complex.

FIG. 10H is a schematic drawing of an embodiment of a symmetrically reversible dump step (Venturi induction amplified) apex combined-cycle turbine Ramjet engine arrangement.

FIG. 10I is a schematic drawing of an embodiment of a symmetrically reversible (Venturi induction) combustion tube Ramjet combined-cycle engine complex.

FIG. 10J is a schematic drawing of an embodiment of supercharge augmented Ramjet conformation combined-cycle fan-jet turbine engine combination.

Figure 8:
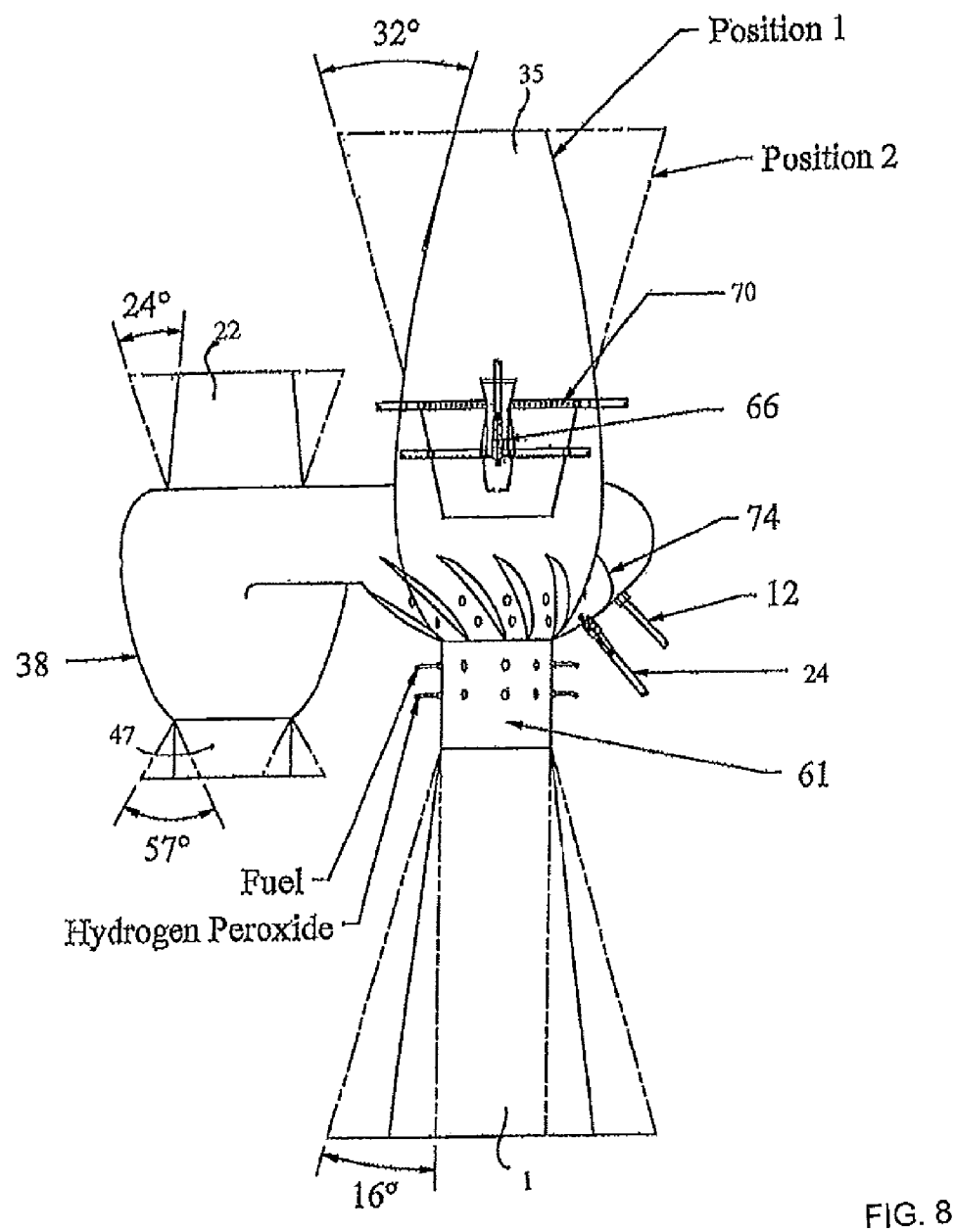
FIG. 8 is a partial perspective view of another unit embodiment of a Ramjet engine component of an engine unit.

Whenever the air speed reaches a predetermined ramjet velocity the forward and aft variable cowling airflow control foils 1, 35 are positioned in position 1 of FIG. 8 and are alternately positioned outward to position 2 of FIG. 8 at a predetermined velocity and altitude. Airflow entering the Ramjet engine 62 is subject to compression and acceleration to super-sonic speeds and increased pressure into a stratified flow zone of high and low pressure into which fuel is injected and ignited. Supplemental air and fuel is injected, and due to the temperature and pressure of the compression and spark from the igniters, ignition is maintained.

Supercharged air from the combined-cycle engine of FIG. 1 at a predetermined velocity is shunted into the Ramjet engine 62. This compressed supercharged air is equal in volume to approximately twice that of the standard volumes per pound of air pressure forced into the combustion chambers of standard Ramjet and fan-jet engines. This occurs without twice the added weight and space requirement and subsequent inefficiency and loss of performance of present engine designs.

Unique lip spike translators are deployed on the forward isentropic cone angle of the forward cowling 22, 35 to control the shock wave disruption on lip condition during supersonic flight.

The supercharged augmented Ramjet combined-cycle engine combination allows compact engine packaging to reduce the weight and size of the engine systems.

The density of the atmosphere and the velocity the aircraft is designed to travel in dictate the maximum and minimum length and opening angle of the air inlet variable geometry forward cowling 22, 35 and the rpm the supercharging engine must be run at.

A unit or modular units of unique aircraft engines taught herein produce propulsive thrust. These combinations and conformations are comprised of a unique and (optional) reversible and counter-gyration turbine fan-jet engine that houses a unique, centrally located oxygen charged and detonation driven free piston engine, co-operating and supplementing the turbine fan-jet engine driving the impeller 6. The engines act in sequence or unison to supply ambient inducted supercharged high-pressure air (oxidant) that is mixed with fuel, ignited, combusted and forcefully expanded convergent toward the lower pressure zones of air and the products of deflagration and detonation producing motive propulsive force and then exhausted. These propulsive driving forces are all created within the confines of the combustor and detonation zone/zones of the unique turbine and free piston engines of this invention, including the unique Ramjet type propulsive engines or Ramjet engine conformations or alternative transformation configurations of apex or vortex J-tube propulsion engines.

The Ramjet engine may constitute a permanent component or conformation of the unit such as shown in FIGS. 12B and 12C. Or, it may be made to eject, or otherwise be launched utilizing other components of the unit, or adjuncts such as rockets, and therein acting much as a launching platform for the Ramjet engine and/or rocket components as shown in FIG. 12A. The modular unit is propelled by the combined-cycle engine until it reaches the transition operating velocity of the Ramjet engine (approximately 300 miles an hour, or lower when augmented by supercharging). The Ramjet engine is activated, and then each component or configuration may be operated together or separately.

Returning again to FIGS. 1-3, the Ramjet engine includes a combustor inlet, a combustor centerbody assembly, a plurality of groups of fuel injectors and igniters, combustion tubes and zones and an exhaust port. An inlet housing (collectively, cowlings 35, 59) is coupled to the combustor inlet and defines a hollow interior volume. The inlet housing 35, 59 also defines a tangent by-pass conduit cowling 52 conducting the oxidant mass-flow from the combined-cycle engine into an apex or vortex convergent vestibule-partitioning zone 61. Prior to entering the Venturi conformation type combustion zone 61 of the Ramjet engine 62, fuel is injected into the oxidizer flow and is ignited. The Ramjet air inlet housing may have an expander (diffuser) cone shaped cowling 59. This cowling 59 converts into a compressor (collector) convergent funnel shaped cowling 35 to maintain an adequate supply of oxidant and airflow mass to the Ramjet engine combustion zone 61. The use of a forward-situated diffuser geometry prevents an excess of Ram effected in-rushing cool ambient air from over-running the ability of the combustor to adequately heat it, quenching the combustion processes and seriously affecting engine performance.

The Ramjet engine 62 includes a separate annular bypass duct associated with bulkhead and containment partitioning wall 60 and partition convergent means of collecting and converging ambient air into an air-stream in the form of flow-directing conduit and pre-chamber 2.

Figure 7:
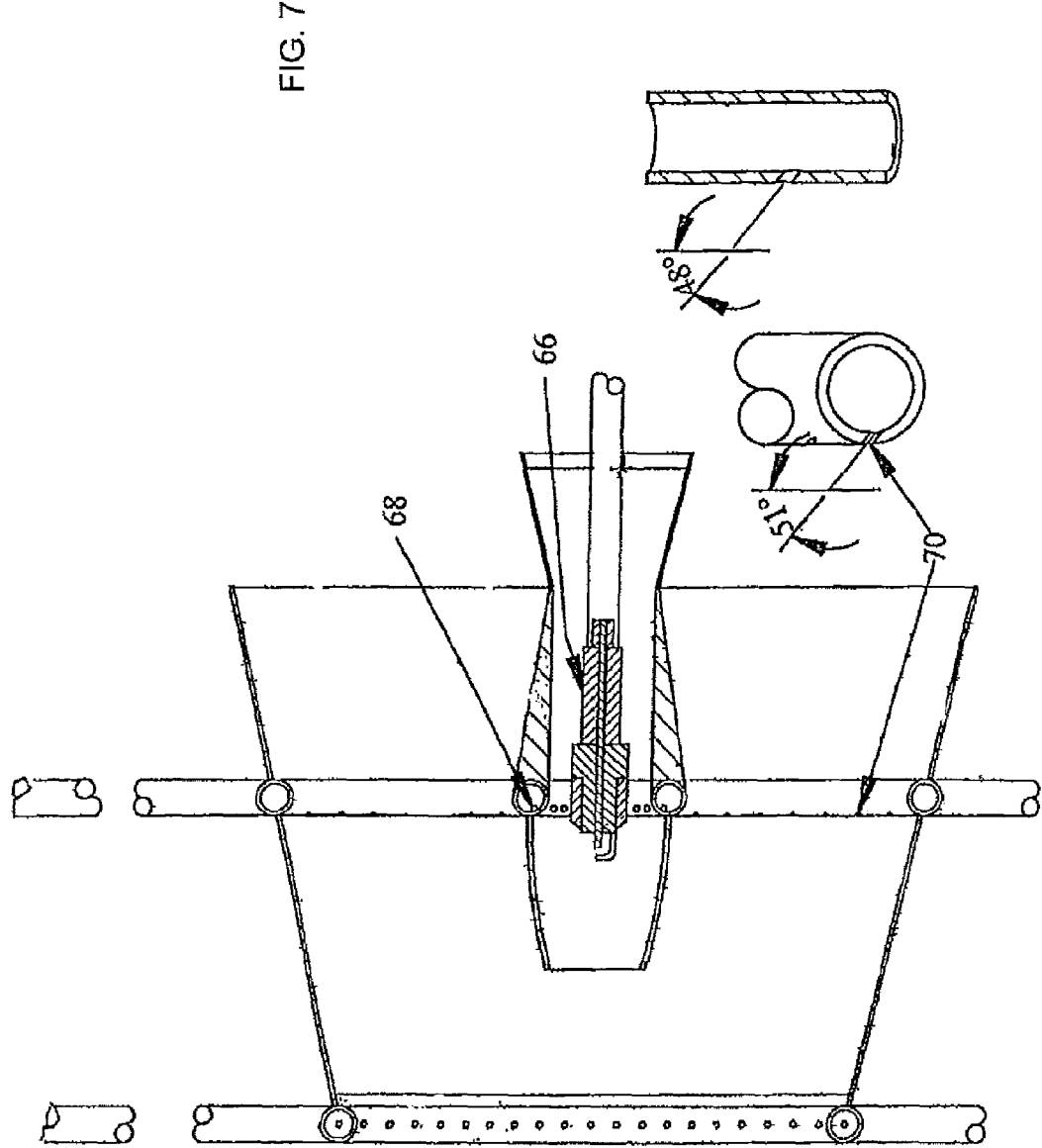
FIG. 7 is a cross-sectional view of an alternative version of an air or pure oxygen and fuel igniter and "torch" arrangement.

Venturi combustor tube inlet/inlets, steps, slots, vanes and voids, such as vanes 74 shown in FIG. 8, may be made to act as flow directing ports, slots, tubes or steps for both the Venturi conformation's peripheral air streams and the central combustor air column to converge toward the apex or vortex zone 61 centered convergent into and around or aft of the central Venturi tube's stratified core air-stream or around the constricting core apex convergent into the combustion zone 61 of the Ramjet engine 62. Also included is a means of bringing about fuel injection ignition for the Ramjet engine 62. For example, in FIGS. 1-3, such means includes igniter electrodes 51/electrical terminal wire 19 supported by fuel injector igniter brace 17. Fuel is input through tube 16. In FIGS. 7 and 8, such means is provided by an igniter sparking mechanism 66. As shown, the mechanism 66 is a spark plug from Champion Spark Plug Co. of Toledo, Ohio, but those skilled in the art will appreciate that other types of igniters may be used, such as glow plugs, plasma jet igniters, microwave and laser ignition devices that are commercially available. An exhaust port or cowling 1 allows the exhaust of combustion gases. The Ramjet engine 62 has a means of creating a greater internal to external pressure differential by having "interchangeable" variable geometry designed into the configuration. That is, the forward diffusion cone 35 is made so that it may become a funnel shaped convergent compressor and is also convertible to thereby become capable of performing as the exhaust nozzle 1, and vise versa. This can be seen, for example, in FIGS. 8 and 10G-10I. In this way, a basic fore and aft geometric symmetry exists. The design allows not only higher altitude operation and overall added performance, but a reverse direction airflow mass thrust and pressure differential that can be created by the reciprocal changing (transposed and reversible conversion) of this geometry. Through a co-ordinate unit reversing and transposing process it becomes possible to bring about reverse or backward impetus and propulsion to the Ramjet engine's mode of operation.

At very high altitudes with cold, rarified air, an adequate air supply must be collected. Even at great velocities the available air isn't adequate to meet the needs of the combustor and is certainly not enough to over-run and quench the combustion processes. But conversely an adequate supply must be made available precluding the need for a diffuser configuration and requiring a convergent means of capturing scarce air. By convergent compression, the rarified cold air need not be "slowed" as it is ambient and not in relative motion locally. But, it produces a velocity of interaction with the aircraft produced by the velocity of the aircraft ramming into the ambient air and forcing the air to move with the aircraft. This occurs while the air, due to inertia, still "attempts" to remain at relative rest with the external ambient environment producing the compression components.

Further, this rarified, cold ambient air is heated by convergent compression, bringing about an elevated temperature of compressive internal interaction high enough to reach and maintain the ignition and kindling temperature of the air/fuel directly related to the rate of the inertial velocity increase and to external velocity. Cold air volumetric over-run velocities are stop checked by the down stream explosive shock processes. The self regulating vortex creating Venturi phenomena and counter harmonic supersonic lateral perpendicular shock wave back-scattering compression and internalized convection heating produced by the combustion processes further down stream in the combustion chamber does not allow any cold air volumetric over run to quench the ignition and combustion processes.

This cool air/fuel mixture is funneled by convergent geometry into the Ramjet combustor, where it is fuel injected and preheated by radiant heat of combustion just before ignition. This further provides a method of boosting and supplementing the available air by means of the oxygen boosted supercharging engine and the direct injection of oxygen into the combustor by well-known means. Such oxygen injection generating oblique to perpendicular shock waves and combustion chamber tuning enhance pre-combustion and combustion heating of the high velocity air stream.

The bypass intake housing 52 from the supercharging turbine engine ducting acts as a supporting brace conduit or cowling opening into the central tubular construct making up the interior volume of the Ramjet engine 62 and contains an air flow restricting valve, also called an air conduit check valve slide mechanism 52a. Variable geometry of both entry and exit ports to the Ramjet engine 62 may be produced through the employment of moveable steps, flaps, cowling, sliding surfaces or partitions, and may be used to alter the enclosed air column from being diffusive to being compressive and visa versa at the exhaust port or cowling 1. This is shown by example in the dotted lines of FIGS. 10G-10I. The unit of engines is comprised of a Ramjet engine as described above. The novel "counter-gyration" turbine fan-jet engine and novel detonation cycle free piston engine are incorporated into a modulus housing, in conjunction with specifically designed aircraft or levitation, elevation or ground effect vehicles. The modula of engines, propelling specifically designed aircraft, or levitation vehicles, including rocketry and payload, act in concert and perform as a prescribed unit.

For example, FIG. 12A illustrates an application of the combined engine concept that utilizes the engine units attached to the wing and body housing of an aircraft carriage fuselage arrangement assisting in a proposed space shuttle launching method.

FIG. 12B is a stylized profile drawing illustration of the three engine units depicting the embodiment of a "wingless" aircraft with variable forward and aft air intake and exhaust vertical and horizontal engine alignment and stabilizing elements. The combined-cycle engine and the Ramjet engine are juxtaposition employed to selectively control the intake and exhaust of air and gasses vertically and horizontally to achieve lift and control yaw, pitch and roll in aerial maneuvers. A separate unit of the Ramjet/combined-cycle engine complex is placed longitudinal to the aircraft's airframe and angle of attack, producing forward thrust aiding in sustained forward flight.

FIG. 12C is a variation of the basic profile view of an aircraft as depicted in FIG. 12A with a Ramjet/combined-cycle engine unit complex placed amidship with airflow directed vertically to provide lift. A Ramjet/combined-cycle engine unit complex is placed aft and longitudinal to the airframe at an angle of attack providing the forward thrust to sustain forward flight.

Returning again to FIGS. 1-3, an important feature described herein is the novel "gyroscopic/counter-gyration" effect created by the contra rotation of the driving and centrifugal super-charging elements of the turbine engine. These elements consist of a rotating and contra-rotating series of turbine radial vane type centrifugal compressors 20, 27 and a separate freely driven combustion driven mediating hub 26.

As previously described, the drive impeller and compressor fans are fitted with jut positioned dihedral angled vanes, effecting dihedral angles of attack to the fluid flow and are oppositely transposed relative to each other.

The combustion-mediating hub 26 is disposed to be driven in an opposing direction to the rotation of the compressor and drive impellers 20, 27 so as to freely maintain a differentially determined driven velocity and thereby counter-balance the gyroscopic torque produced by the rotation of the compressor and drive impellers 20, 27. The combustion-mediating hub 26 is positioned on a sliding carriage arrangement 13, 67, disposed symmetrically upon a common cylindrical drive shaft 41, and placed forward on this shaft 41 is the impeller 6. Impeller 6 is situated on this shaft 41 so as to allow it to become (if desired) nearly instantly reversible. This is achieved through the selective positioning of the combustion-mediating hub's carriage arrangement position relative to the "top dead center" of rotational symmetry of the impeller elements 20, 27, and thereby positioning the combustion mediating hub's 26 rim to its nearest proximity relative to the electrode points of ignition. Thereby the mediating hub and carriage arrangement 13, 67 is selectively positioned axially, longitudinally "forward or aft" on the drive shaft 41 by movement of the carriage arrangement 13, 67 along a spline line 42 machined into the drive shaft using carriage toggle linkage 23. This causes combustion to occur on the forward or backward side of the combustion mediation hub 26 and by selectively moving the combustion mediating hub 26 aft of "center". This movement brings about the reversing of the rotation of the impeller drive mechanism due to the opposite set of the angles of the drive and compressor impeller 20, 27 vanes. "Center" occurs when the mediating hub 26 is in its nearest proximity to the ignition electrode points 25 and injector jets 40.

Figure 9:
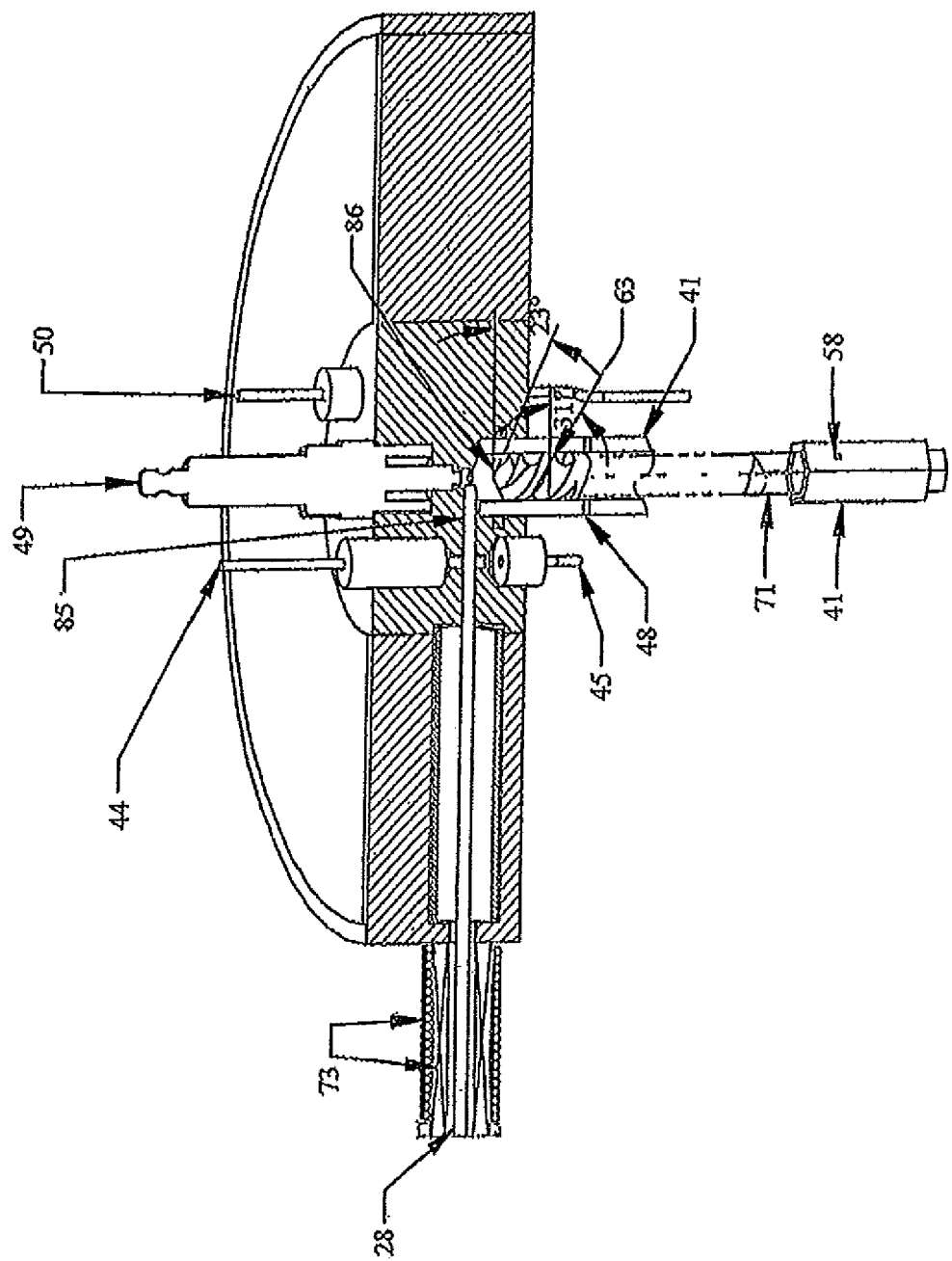
FIG. 9 is a partial cross-sectional view of the detonation chamber head and arrangement of some of the interior components.

The tubular central drive shaft-cylinder 41 is supported by main drive shaft bearings 30, 31 and houses within its enclosed volume a reciprocating-rotary "free" piston 3 forming a portion of a "detonation" engine, also called a free piston engine. Driving detonation is brought about through the use of compressed or chemically combined pure oxidant and fuel and, when injected under the proper conditions of temperature and pressure, ignite, bringing about a detonation explosion which then drives its cycle. As shown in FIGS. 2, 3 and 9, drive shaft-cylinder 41 includes turbine engine lubrication ports 58 through its wall.

Figure 6:
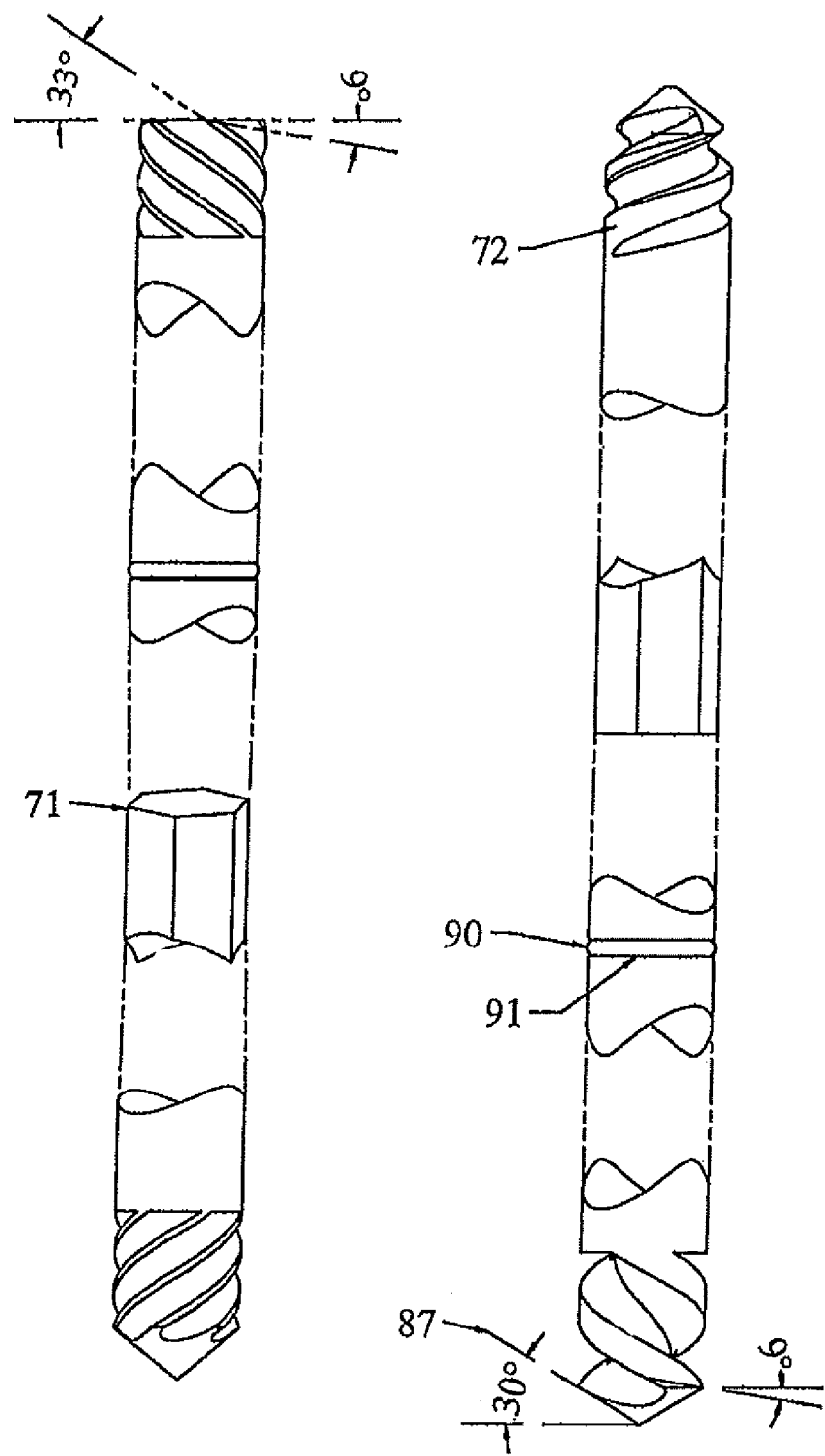
FIG. 6 shows perspective, cutaway views of the free piston.

The free piston 3 of the free piston engine is made of an opposing set of interconnected oppositely turned (left to right, right to left or clockwise; counter-clockwise) spiral shaped fluted two-way transposed screw or drill bit 72 like arrangement as shown in FIGS. 4, 6 and 9. More specifically, FIG. 6 includes different embodiments of a possible piston 3 illustrating variations of transposed (reversed) helical screw exhaust channeling configurations 72 of the free-piston 3, while FIGS. 4 and 9 specifically show a screw fluted detonation piston 63 as piston 3. As can be seen most clearly in FIG. 6, a pressure relief slope is cut into the face or "firing deck" of the screw bit like configuration at an angle 87. The reacting, responding surface of the bit like piston face 86 is cut to produce a critical angle to the percussive forces driving the piston 3 and thereby produces a wedging radial annular component, turning the piston 3 into a helical driving moment. The piston 3 is disposed within the cylinder-drive shaft 41 so as to rebound (bounce) back and forth, reciprocating and rotationally screw driving the alternating displaced piston. The piston 3 is also set within the drive shaft-cylinder 41 so as to not allow the reciprocating piston 3 the freedom to revolve within the cylinder 41 without revolving the cylinder 41 as well, thereby adding rotational thrust to the cylinder-drive shaft 41 and always in the same rotational direction. The central reciprocating co-operating aspect of the piston shank section 71 is so constructed as to have a polyhedron or oval shaped cross-section section or being slotted or grooved in contrast to the otherwise cylindrical piston arrangement. The piston configuration is fit into a cylinder 41 with a matching polyhedron or oval cross-section and is made long enough (reciprocation range) to allow proper reciprocation tolerances and all other clearance tolerances. Or, the piston configuration is otherwise designed to allow the reciprocating piston 3 to revolve and thereby cause the cylinder/drive shaft 41 to revolve, through the use of retention slots and pegs, keepers, key ways, spleen carriage, tongue, slots and/or grooved sections of the piston-cylinder walls, etc. For example, FIG. 2 shows a keyway cut 8 into the piston 3 and drive-shaft cylinder 41 to provide lateral spiral rotational movement of the free piston with the concomitant rotation of the drive-shaft cylinder 41 that can replace a portion of the polyhedron or oval cross-section, and FIG. 6 shows the inclusion in the free piston 3 of a detonation combustion containment ring 90 and land 91.

The piston 3, being placed within the drive shaft-cylinder 41 so as to be displaced and arranged so as to add rotational torque to the displacement alternating and reciprocation driving process, is always revolving in the same rotational direction, driven by the detonation of the injected fuel and pure oxidant mixture. Thereby, the detonation drives the piston 3 back and forth between opposing detonation chambers 7 with reference to FIG. 9. The fuel and the pure oxidant, being injected, may be in either liquid, gaseous, paste plastic or powder form. The fuel is of a preferred class of fuels consisting of either a carbohydrate or a hydrocarbon, hydrogen or the fuel and oxidant reactants being otherwise hypergolic in nature. When the preferred fuel is a powered carbohydrate, the preferred oxidants should be liquefied oxygen, hydrogen peroxide or simply water with a minute quantity of electrolyte added to physically adhere to the surfaces of the power granules by surface tension. The surface tension bonding of the fuel components is a compelling reason to utilize liquefied oxidants whenever possible to maintain the compressed fuel distances needed to maximize the detonation reaction.

A like exponential response occurs in the reciprocal rebounding and revolving of the piston 3 such as shown in FIG. 6. The helical or spiral grooved screw shaped piston 3 is fabricated in such a manner that the venting of the detonation pressurized expanding gasses produce rebounding and rotational torque. The pressurized gasses of detonation are channeled through the piston 3 and the exhaust ports 48 cut into the walls of the drive-shaft cylinder 41 and thereby, due to the oppositely arranged (transposed) screw spiral piston geometry 72, the resultant rotational torque is always maintained in the same direction. This adds impetus to the drive shaft-cylinder 41. (This built-in torque directing aspect of the engine operation is not reversible.) The piston 3 rebounds and rotates back in the opposite direction, maintaining the same rotational direction, toward the opposite detonation chamber 7. In the detonation chamber 7, fuel and pure oxidant have been inserted, mixed and await the compression of the returning piston 3 to produce the "carry over" inertia to produce ignition, detonation, rebound ("bounce") and rotation torsion and torque and so continue the cycle as can be seen by referring to FIG. 9. The reciprocal motion of the piston 3 is transmitted into the rotary motion required of the impellers 20, 27. This motion is capable of starting operation of the turbine engine component and otherwise supplementing its operation during high altitude flights or when operating under overload conditions.

The above-described detonation occurs in two hundred billionths of a second, and the response requires the careful timing and injection of the reactants. The injectors may be differential plungers actuated by the detonation charge of the free piston engine that react in nanoseconds in the form of a catering shuttle (fuel and oxidant injector carriage 28 extending through a combustion-directing channel 85 cut into the turbine engine wall) that is explosively driven past the fuel and oxidant inlet ports formed by oxygen catering injector connector 44 and fuel catering injector connector 45. This opens up the ports so that, as shown in FIG. 9, oxidant flows through connector 44 and fuel flows through connector 45. Then the injector carriage 28 is forced back by other means 73 (springs, solenoid, hydraulic, pneumatic, mechanical or translated as a response to detonation), closing the ports, injecting the mixing charge into the detonation chamber 7 or directly utilizing the force of the detonation reaction in the opposite detonation chamber 7 to aid in bringing about injection into the detonation chamber 7 and time the ignition using free piston engine spark plug igniter 49. Alternatively, other appropriate means can be used to indirectly inject the charge into each detonation chamber as long as the means used is quick and powerful enough to activate an appropriate explosive charge driven fuel injector response or activate the electric spark or glow plug or other appropriate igniter. Lubrication tubing 50 allows for engine lubricant to be supplied to the combined-cycle engine through supporting brace 46 as shown in FIGS. 1 and 2. Igniter 49, connectors 44, 45 and tubing 50 are enclosed within combustion chamber cover 21.

The timing of these "catering" aspects controls the speed of free piston engine's operation. The spark ignition can utilize electric capacitance discharge systems that are capable of producing 100,000 volts and/or high-speed lasers or glow plugs depending upon the ignitable qualities of the fuels to be used, the velocity of operation and the fact that the ignition may be needed only for start up warming procedures. The free piston engine is allowed to auto-ignite (detonate) once in operation by electrical spark or other appropriately timed and sequenced ignition means, but desirable spontaneous detonation reactions may be made to occur without the aid of external activated ignition if an appropriate mixture of fast acting high velocity fuel and oxidant accelerator is used. Alternatively, a separate means of injection whereby hypergolic reactants are injected separately into the detonation chambers 7 occurs. This injection procedure must be carefully controlled and monitored as the velocities of this type of explosion reach 21,000 feet per second in unconfined spaces. The reactants quench or dampen and otherwise control the velocity of the reaction. In order to reach great heights and carry heavier loads and maintain cleaner exhaust emissions, engines with the potential to utilize a self-contained oxidant as well as hydrogen or other gaseous fuel containment means and the injectors are designed to handle both fuel and oxidant.

The turbine engine component of the combined-cycle engine provides for the conversion of the high temperature and pressure of the combustion of fuel and oxidant into rotary motion and jet propulsion. Referring to FIG. 1, an ambient air oxidizer annular inlet housing (variable geometry air intake cowling) 22 adjoins the impeller 6 and annular centrifugal supercharging air pump housing 5 and forms a path for air through an opening 89 in housing 5 to a cylindrically conformed hollow interior volume. The hollow interior volume defines an annular central low pressure and high pressure partitioning arrangement for the centrifugal vane type compressor and drive impellers 20, 27.

The central pressure partitioning is provided by the unique pressure directing, freely revolving, oppositely rotating combustion mediating hub 26 that is set axially and symmetrically disposed upon the drive shaft-cylinder 41 and anchored upon an axially aligned positioning carriage 13, 67. As mentioned previously, the vanes thereby provide the ideal point location to inject fuel, intermix with compressed air, ignite and bring about combustion, producing explosive high pressure superheated gasses. The heated expanding combustion gases are vented directly into the vanes combustion mediating hub 26 and those of the drive impeller 27 and thereby drive the impeller 6. This simultaneously drives the compressor impeller 20, compressing the induced ambient air oxidizing medium and bringing about the conditions for combustion, actuating and maintaining the driving process.

Means of containing fuel, water and compressed oxygen and the means for over-boost injection and the means of distribution are also included. Water injection should be reserved for use with the combined-cycle engine.

These auto-synchronizing processes are possible due to the fact that the compressor impeller 20 and the drive impeller 27 are anchored to the common drive shaft 41 by means of the positioning carriage 13, 67. Alternatively, the whole drive shaft 41 may be moved, moving the fixed impeller elements 6, 20, 27 relative to the ignition points 25. The compressor and drive impellers 20, 27 may be anchored directly to the drive shaft 41 and positioned relative to their proximity to the ignition points 25 by moving the shaft 41 axially backward and forward, thereby mitigating the relative selective positioning of the combustion mediating hub 26 relative to the ignition points 25, transposing the combustion space 86 driving the drive impeller 27 to driving the compressor impeller 20 in a reverse rotational direction providing engine reversal.

The compressor and drive impellers 20, 27 are separated from one another by the interfacing, oppositely rotating, free revolving combustion mediating hub 26. They act in accordance with each other to heat and compress cool inlet air, mix the air with injected fuel, ignite and explosively expand the gases of combustion out and around the circumference of the combustion mediating hub 26. The superheated burning, explosively expanding gases act upon the uniquely arranged and disposed vanes (offset, parallel and jut positioned, inset, transposed, mirror image symmetry) of the combustion mediating hub 26. The vanes rotate the free turning interfacing combustion mediating hub 26 in the required opposite direction to the drive of the drive and compressor impellers 20, 27. The combustion mediating hub 26 intercedes and forcefully selectively checks, dictates and assists the airflow and pressure direction to maintain the required pressure differential between the compression and combustion zones. This superheated compressed gas ignites and expands explosively between the interior engine wall 4 and against the vanes of both the combustion mediating hub 26 and the drive impeller 20 or 27. The vanes of the drive impeller 27 are set (disposed) at approximate 45-degree dihedral, axismetric, acute and optimal oblique angles (to deflect the gas drive in both right and left-hand rotational directions) to that of the longitudinal drive shaft 41 and gas flow direction. The driving and compressor vanes of the combustion mediating hub 26 are set radial at 45 and 90 degrees and are oppositely transposed mirror image and perpendicular to the gas driving flow and the combustion mediating hub 26. The vanes together react to equalize the pressure differential producing gaseous inertial drive (moment), driving the combustion mediating hub 26 and the drive impeller 27, thereby driving the vanes of the compressor impeller 20, which are set at 45 degree acute and optional oblique dihedral angles that are angled facing into the gas flow, perpendicular and radial to the gas flow. The intake oxidant (air) medium is centrifugally compressed into the confining combustion zone or space 86 between the rim of the combustion mediating hub 26 and the interior of the engine housing wall 4. In this combustion zone 86, fuel is injected onto the combustion mediating hub 26, much like a splatter wheel and thereby being forcefully centrifugal mixed into the compressed, heated, confined, highly turbulent air bringing about ignition and continuing the combustion propulsion processes. Then the residual expanding gasses of combustion are exhausted, driving the impeller 6 anchored to the common drive shaft 41 and directing supplementing air convergent to the Ramjet engine. Cool air is furnished to cool the turbine engine through bypass air cooling ports into bypass air ducting 64, which is formed between carriage housing wall 4 and turbine engine wall 38 and also charges the conformation engine afterburner apex zone in FIG. 3, and heated air is furnished to operate the engines and all the engine afterburners.

One or more combined-cycle engines and Ramjet engines can be incorporated into a unit or units that act together or separately. One embodiment consists of a reversible (optional) supercharging combined-cycle turbine engine and a reversible (optional) Ramjet conformation engine such as shown in FIGS. 10G-10I. An over-boost (supercharge) of compressed ambient air and also injected oxygen and/or hydrogen peroxide are provided with the fuel such as shown in FIG. 8 to insure ignition. The engines all act in sequence finally to impart the momentum required to run the Ramjet engines, bringing about improved interior fluid gaseous flow dynamics.

The Ramjet engines described herein lend themselves to designs using a set of mathematical indices, which are: the equation of energy, momentum, the theorem of continuity relation, and equation of state, variation of specific heat and adiabatic exponents in respect to temperature, air mixture composition as well as actual cross section of the jet tube or Ramjet conformation engine. In particular there is the relationship between F1 (frontal cross-section) and F2 (frontal cross-section), which create the diffusion zone of the past art. At very high altitudes standard Ramjet engines and in fact all other air aspirated non-oxygen supercharged engines stop functioning when ambient air, acting as the only oxidizing and propulsive medium, is thin (reduced) enough. Accordingly, "fixed" ratio Ramjet engines have a self limiting narrow optimum range (window) of operation and become impeded and in fact are seen to slow down in operation and stop functioning at very high stratospheric altitude.

The supplementary oxygen boosted combined-cycle turbine-jet engine driven supercharging air pressure provides a concomitant increase in internal and external differential air pressure. This allows the Ramjet engine's combustion zone to become more efficient, becoming capable of being designed with a relatively shorter length to width ratio than that of a conventional Ramjet engine and operating cooler and providing more efficient and effective per pound of forward thrust. An increase in the forward directed thrust to the engine configuration allows the Ramjet engine diffuser cowling 59 can be made to exceed the 6 to 10 degrees negative angle of the fixed angle of the Ramjet's diffuser cowling to a 20 degree positive fixed angle in approximation. The cone shaped diffuser cowling 59 varies into a funnel shaped convergent compressor extended cowling or prechamber 2. These elements are placed forward of the combustion zone 61 of the Ramjet engine, thereby producing a convergent funneling, channeling means and method of collecting and concentrating the ambient external airflow mass. In this way, a concentrated compressed airflow mass stream is furnished and rammed at velocity efficiently to the Ramjet engine combustion zone 61.

Then, by supercharge supplementing an additional airflow mass into the Ramjet engine with the combined-cycle engine, the Ramjet engine is made to maintain an adequate ambient oxidant supply over an extended operational range. Maintaining an external to internal pressure differential and the concomitant adequate internal airflow and combustion gas velocity and mass flow rate gives an equal and opposite forward mass propulsive push per pound of backward thrust, improving overall engine performance and range of operation. This performance and range parameter may be extended through the use of hydrazine and oxidant injection such as hydrogen peroxide through openings such as shown in FIG. 8, thereby allowing the combined unit of engines to remain functional over greater varying velocities, increased loading capacity and at higher altitudes, with further assistance from oxygen/hydrogen peroxide injected boosting and from the oxygen boosted detonation cycle free-piston engine. This procedure is reversible and thereby the variable geometry cowling 35 may be made to act as the variable geometry exhaust nozzle and the variable geometry exhaust nozzle 1 may act as the variable geometry forward cowling and visa-versa as shown in FIGS. 10G-10I, which illustrate some schematic stylized drawings of embodiments of symmetric mirror image, transposable and reversible design variations.

Each Ramjet engine can have a combustion zone 61 whose length to diameter ratio is about 1 to 1. This refers to the classical "square" dimension, but the dimensions may go up to 2 to 1 and have an entrance apex or vortex stratified convergent zone and an exit exhaust divergent zone such as shown in FIGS. 10B, 10H and 10I. The Ramjet engine has a variable extended cone shaped diffuser cowling converting into a variable funnel shaped compressor cowling placed forward of the combustion zone 61 and being not less than 6 degrees negative included angle of the diffuser cowling as shown by example of the dotted lines in FIGS. 10A and 10J.

The Ramjet engine has a variable extended forward cowling 35 so devised that it is variable from the negative included angle to one of a positive 20 degrees included angle and acts as a convergent compressor accumulator, or "collector ram" of oncoming conducted, inducted air. This produces a positive pressure gradient within the extended cowling, selectively maintaining and increasing the airflow mass and velocity and maintaining and even increasing the negative differential pressure convergent efficiency potential of the Venturi tube or zone. The negative amplitude of the stratified air and fuel injection static pressure gradient zone of the Venturi effect is amplified and enhanced within the Ramjet engine's combustion zone 61. The Ramjet engines 62 are constructed of a combustion chamber section only. Optionally, one constructed with a Venturi apex zone and one constructed with a Venturi vestibule vortex zone and one with a recirculation vestibule zone completely surrounding the Ramjet engine combustion tube and being mirror image transposable are used. (See FIGS. 10A and 10J).

Ramjet engines are integrated into clusters of the same engines or units of a variety of engines consisting of different numbers and combinations of combined-cycle supercharging turbo-fan jet engines and rocket engines. The Ramjet engines comprise at least one forward and one stern (aft) moveable element (nozzle) making up the variable geometry components for tuning the fluid flow dynamics of the module conformation.

Along with sliding tubular combustor sections for tuning the vestibule reverberation and recirculation apex and vortex focusing convergent Venturi combustor cambers and zones, a Ramjet engine comprises forward and stern (aft) nozzle variable elements and Venturi vestibule apex pre-chambers and combustion chambers that have been set into position symmetrically. This allows transposition and allows the reversing of engine function and the direction of propulsion such as shown in FIGS. 10D-10F.

The elimination of standard static combustor or rotating combustion chambers in the combined-cycle engine is achieved by ejecting the explosive force directly upon and rotating the combustion mediating hub 26 directly by deflection without any intervening combustion chambers. The explosion is simultaneously directed upon the oppositely retreating drive impeller 27, allowing both sets of vanes to avoid confronting the explosion by "turning directly into the explosion" but always retreating and turning by being driven by deflection away from the explosion.

Therefore, the vanes or blades of the impellers 20, 27 and hub 26 are designed relatively flat, more like paddles than airfoils. This eliminates the need to shape them into more fragile airfoil or constant camber aerodynamic constructs as is standard in the state of the art turbine or turbofan aircraft engines and represents more robust reflecting rebounding angled deflecting platforms. The design of the vanes concerns forces that are more like those that affect the designs of paddle wheels or Pelton water turbine cup like conformations or light reflective surfaces than weather vanes. This is because shock effects behave more like a fluid with the density of water and follow molecular statistical and ballistics effects. Shock terms involve impacting forces that can be many times those experienced in standard engine combustion processes.

Further, symmetry of both sides of the vane designs is a requirement in versions of the reversible engine designs. The high velocity gas molecules rebound (ricochet) off the surfaces of the compressor impeller vanes at angles of incidence and angles of reflection, producing a positive driving pressure. This pressure is directed by the spinning contra rotation of the combustion mediating hub 26 and the offset set position of the ignition points 25 and explodes upon the exposed drive vane angled surface, while being directed by deflection and inertial impetus away from the adjacent drive impeller vane and into the receding, divergent reduced pressurized space of the oppositely rotating set of drive impeller vanes.

This creates a low-pressure gradient on the reverse, anterior or "shadow" side of the adjacent impeller vane and a relatively high pressure on the retreating exposed angled surface of the down stream set of the oppositely-rotating vanes. By this deflection, lines of least resistance are effected and the driving gasses follow these lines of least resistance, producing equal and opposite thrust. The energy of deflection remains as kinetic energy residing in the inertial rotational drive of the impeller drive system. The series or sets of drive impeller vanes are opening or are driven apart by the explosion and one half of the explosion is deflected by the first set of mediating hub driven vanes and focused into the vanes of the retreating driven impeller vanes. This prevents the explosion from directly confronting the oncoming vanes by deflection, nullifying the retreating interacting supersonic shock modes through subtractive cancellation produced by the divergent super-imposition of the peaks and troughs of the reflected hypersonic waveform interference produced by the reflection from the adjacent impeller vane, thereby creating further lines of least resistance. Directing and focusing the remaining residual energy terms and the other unengaged half of the explosion along these lines of least resistance directly into the direction of opposite rotation of the oppositely retreating set of driven impeller drive vanes occurs.

These drive impeller vanes are set to receive and rebound (ricochet) the gas stream perpendicularly off 45-degree dihedral angled opposing vane surfaces. The explosive energy is rebounded and deflected out of the way of the oncoming impeller vane, directly striking the next series of drive vanes rotating in the opposite direction of rotation.

The drive train is resolved into a single direction of rotation produced by straightforward driving processes, greatly overriding other less forceful and indirect driving processes. With each rebound directly gaining one half the energy inherent in the gas mass inertial velocity, this exchange rate is exponentially and algorithmically established relative to the velocity of the impinging gas stream. The rebounding molecules disrupt the molecules forming the shock wave front, and the energy is absorbed and converted to heating the remaining unburned air/gas mixture, quickly completing combustion.

The design ratio of the width to length dimensions of the driven vanes should be keep at as high an aspect (shortened vane width, relative to length) as possible to prevent too much rebound interference from the negative or shadow (anterior) adjacent surfaces of the vanes as well as eliminating drag on the driven vane. The number of vanes and distance between the vanes for both compressor and driver impellers 20, 27 depend on square area and the number of revolutions per minute the impellers 20, 27 are designed to operate at and are a result of matching the work load requirements to the specific impulse of the fuel. There are benefits to dynamically shaping the vanes to reduce friction, gain strength, reduce weight and extract the greatest amount and efficiency of drive.

One turbine-jet engine embodiment of this invention utilizes two 45 degree opposite reflected angles. That adds up to a 90-degree angle, which represents the angles of incidence and reflection of the driving forces being transmitted in both directions. One angle directly transmits the energy of incidence to the drive shaft 41 and the other angle indirectly transmits by mediating the responding obtainable drive potential through the combustion mediating hub 26 to culminate into the rotational direction of the drive shaft 41, evenly dividing the load and drive actuating and controlling differential components, thereby automatically adjusting them one to the other.

Airfoil like vane designs may be utilized to scavenge the gas flow energy in more stabilized and/or less turbulent gas flow stages further downstream of the first stage explosive percussion driving events to derive added efficiency and drive from the engines. The application of driving force directly upon the surface of the driving vanes set at a 45-degree inclined dihedral angle of attack to the gas flow stream is a dominant driving phenomenon of the turbine engine component as embodied in this invention but is not the only one. Varying the angles of attack of the drive vane is another method to obtain overall optimum drive performance.

In a state of the art turbine engine vane or blade design, the negative and positive pressure zones intercommunicate vigorously between segregated air-foil produced pressure zones. If these differentials are the only pressure differentials driving the turbines, hyper or supersonic turbulent events bring about dynamic equilibrium and propulsion stall, ending these engines' ability to function. In the engines of this invention, however, the action of the explosive combustion force upon the drive impeller vanes is transposed directly though the commonly shared drive shaft 41. Through the flow directing action of the oppositely rotating combustion-mediating hub 26, a subsequent doubling of the apparent closing velocity of the resulting two opposing and convergent eclipsing compressor vane arrangement results, producing an apparent closing and wedging compressing velocity greater than the average compressed air flow velocity. The air flow moves outward diagonally and laterally to the direction of the contra rotation of the impeller vanes squeezed between the converging vanes and the interior engine housing wall 4 and through the pressure dividing combustion mediating hub's clearance dimension represented by the combustion mediating hub's proximity to the fuel metering ports 40. This effectively reduces the interceding restricted and confined fluid flow rate rapidly toward zero, which is then accelerated by combustion and strikes the vane surface of the drive vane impeller.

The performance of the vanes involves many varied and diverse functions that together influence vane design. The flow directing combustion mediating hub 26 separating the compressor zone from the drive zone focuses these fluid flow force vectors into fluid compression fields, efficiently compresses them and builds up the internalized air pre-heating processes. This increases the intermixing chemical reaction rate, capability and capacity potential, decreasing the chemical reaction time and decreasing any excess pre-heat required to maintain the kindling or ignition temperature of the air/fuel mixtures. An ideal, stable and localized fuel injection and ignition space 86 is produced, increasing the achievable peak overall post-combustion expansion and cooling processes and thereby increasing the achievable rate and velocity of the combustion reaction. In this manner, the propulsive potential of the engines is increased.

Further, the impinging back pressure exerted by the back scattering oppositely (forward) directed explosive shock wave created by the combustion front completely counters the backward incoming compressed air flow. This counteracts the disruptive attributes of these shock waves and converts them into very effective compression heat producing and fluid flow checking and directing force vectors. Accordingly, the overall volume of the compressed air charge within and between the flow directing vanes is further reduced, converted by these means of shock wave compression into heated compression field points. Ignition "points" are produced where the pressure and temperature become ideal for efficient ignition and combustion expansion driving processes, creating the localized space 86 where oxygen and fuel reach proper stoichiometric ratios and the flame temperature approaches adiabatic flame temperature. This increases the efficiency of the combustion process by reducing the time required of these processes and gains localized flame retention stability and a cooler overall operating temperature, with concomitant flame out prevention capability.

Ignition does not occur until fuel/air mixing, pressure and temperature reach the point and position that first reaches the mixture's ignition temperature. Any delay simply automatically produces combustion downstream further into the combustion-mediating zone of the rotating combustor vane or into the drive impeller zone driving the cycle unless ignition does not occur at all. The total lateral fluid flow rate approximates zero as the two contra rotating set of opposing compressor vanes squeeze and compress the induced air fuel inter-mixing liquid and gaseous fluid complex into a space 86 convergent toward zero (the ideal ignition point). This space 86 is where fuel injection orifices 40 and ignition points 25 are located. The highly compressed superheated air is "spun out" in the direction of rotation into the oncoming oppositely rotating drive vanes to reach a near stop. Fuel is injected and ignited within the constricted space 86 created by the compressor impeller 20 and rim of the combustion mediating hub 26 and the interior wall 4 of the engine housing.

The engine-housing interior wall 4 acts as an efficient effective cooling surface, maintaining easy cooling access to the exterior of the engine and reflecting the explosive energy back to aid in driving the impeller. In contrast, in other state of the art revolving and stationary combustor arrangements, the combustion chamber vessels can only be cooled from the internal and highly restrictive confines of the engine. The building up of the convergent compressive elements within the flow conducting and directing space 86 allotted between the contra rotating vanes as well as the interior engine housing 4, being counter checked, are turbulently intermixed, supercompressed and pre-heated by the shock wave and the radiant heat of the combustion occurring just "downstream" of the fuel injection and ignition sites 40, 25. Further combustion and expansion processes occur producing equal and opposite propulsion and motor response to the revolving combustion mediating hub 26 and act directly upon the drive vanes of the drive impeller 27 and expand outward, exhausting through the engine's exit port, variable geometry exhaust expansion cowling 47.

The highly efficient detonation like combustion processes obtained in variant embodiments of this invention are not as detrimentally affected by hypersonic percussion combustion processes as the standard state of the art turbo-jet and turbine engines that are built with static confining and restricting combustion reaction chambers that are very sensitive to shock events. With the turbine-jet engine component of this invention, there are no static confining and inclosing combustion chambers to retain and hold back the reactions. The reactions explode directly upon the driving impeller vanes designed to respond to these high velocity detonation reactions by moving with the forces rather then restricting, restraining and being disrupted or destroyed by them.

The straightforward and forceful drive is produced by the hypersonic velocities of gas flow realized by the percussive explosions of the fuel, air and/or pure oxidant. The velocities are optimally realized when reflected from a vane or foil surface set at a 45-degree dihedral angle of attack to the gas stream. But, this angle may be reduced to 30 degrees or less depending on the velocities the engines are designed to run at or the number of drive turbine impellers that are to be implemented. The length to width high aspect or ratio of the vane dimension should be kept to a minimum width to keep backscattering interference to a minimum by allowing the expanding gasses to be deflected clear into driving the main oppositely rotating drive vane.

Airfoil like vane designs may be utilized to scavenge the gas flow energy in more stabilized and/or less turbulent gas flow stages further downstream of the first stage explosive percussion driving events to derive added efficiency and drive from the engines. Driving force is directly applied upon the surface of the driving vanes set at a 45 degree angle of attack to the gas flow stream. The equal and opposite deflected driving thrust produced thereby is the dominant driving phenomena of the turbine engine component as embodied in this invention. Varying the angles of attack of the drive vane can be used to obtain overall optimum drive performance.

The negative and positive pressure zones intercommunicate so vigorously between the segregated airfoil produced pressure zones that (if these differentials are the only pressure differentials driving the turbines) hyper or supersonic turbulent events bring about dynamic equilibrium and propulsion stall. Stall ends the ability of these vanes or turbine blade aerodynamic constructs to function, and they do not define the reflected symmetry that allows them to produce the same functioning driving processes that cover the full range of operation and then still function as well in reverse.

Figure 13:
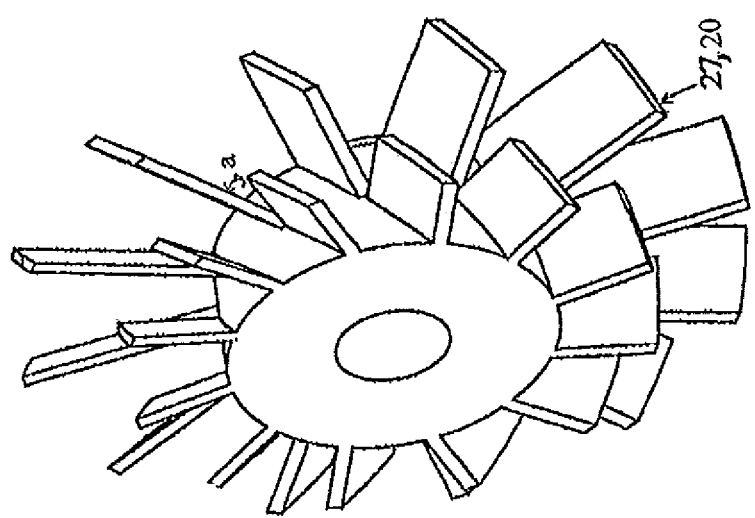
FIG. 13 is an impeller according to an embodiment of the present invention.

In a variant embodiment of the invention, not only are the drive impeller vanes set at a 45-degree angle to the lateral rotation direction of the impeller disk and the longitudinal axial gas flow direction, but they are also set inclined, tilted at a 45 degree cant (oblique, acute tangent angle) nearly tangent to the rim of the drive impeller 27 while maintaining the 45 degree twisted or turned, oblique inclined angle a as shown in FIG. 13. This "cant" oblique tangent angle not only adds 45 degrees of cant or skew to the 45 degree driving gas deflection angle of the vanes, but it also causes the flow force to be transferred ("tilted") skewed forward of the center of effort and revolution of the drive impeller 27 and drive shaft 41. This 45 degree offset, inclined tilt to the dihedral angle of the driving vanes causes the driving force to be expressed forward of the drive impeller's rotational center of throw, due in part to the lapse of time delay in the explosive combustion detonation processes. This effectively keeps the driving force pushing the drive vanes away from the points of dynamic equilibrium and the point of stall and tilting (tripped) skewed into the direction of rotation. The conservation of momentum is preserved and gains drive advantage over vanes set only at the singular 45 degree fixed dihedral angle to the longitudinal gas flow direction. Drive gases are trapped in the apex of the wedge produced by the complex acute tangent dihedral angle to the impeller drum rim, reflecting and focusing them back unto the incoming shock waves driving the vanes, braking up the waves and redistributing them as less distressing events and adding to the heating of the combusting fluid medium. The straight 45-degree dihedral angle drive vane has very appropriate applications dependent upon fuel and load considerations.

As previously described, the Ramjet engine has a forward cowling 35 including some portion surrounding the combustion zone 61. The cowling 35 is partitioned and ported with selectively adjustable tubular elements or tubular combustor ducts to form a tunable Venturi apex or vortex vestibule and recirculation and preheating zone 2. The Ramjet engine is attached by adjustable means of ducting to the impeller 6 of the combined-cycle engine. Partitioning selectively diverts a first portion of the airflow into a bypass duct or a series of tubular ducts or combustor ducts. Ramjet engines include a plurality of air, oxygen and fuel injection and igniter means 12, 57. These inputs are mixed with a second portion of the airflow peripheral to the central core air stream and the central primary combustor 61.

The mixture is ducted into and through the tubular combustor ports or dump step and quarl (where the mixture may or may not be ignited) into the low-pressure primary (apex) zone of the Ramjet engine 62. These elements co-operatively act to supply the oxidant, fuel and mass airflow rate required to supplement the drive of the Ramjet engine, thereby maintaining the stoichiometric conditions and air mass velocity required for maintaining the proper functioning of the Ramjet engine.

A Ramjet engine includes ducting from the impeller 6 with impeller vanes set perpendicular to the air column and/or partially angled as required to supercharge the Ramjet engine and to supercharge the turbine engine component. This furnishes both cooling and oxidant air mass to the turbine-jet engine. The ducting is constructed with stationary or moveable vanes or partitions perforated with tubular combustor ports or dump step and quarl conformation, convergent to the after section (vestibule zone) of the combustion zone 61 of the Ramjet engine. The ducting is gated or otherwise diverted, by-passed or bled from the auxiliary air pump supercharger engine component of the unit's distribution ducting 64 to converge or otherwise conduct auxiliary air or other oxidant into the low-pressure apex or vortex vestibule zone 61 of the peripheral Ramjet engine. As a result, a zone of recirculation and radiant preheating of the induced air is formed where the air is divergent focused and prepared for ram injection into the combustion zones of the Ramjet engines and combustion in the afterburner combustion zones of the engines.

This ducting forms a forward element comprising the bypass oxidant ducting partitioned recirculation and preheating zone to divert the convergent Ram charged first portion of the oxidizer flow to the apex or vortex convergent focusing and Venturi amplifying vestibule or tube combustion zone 61 of the Ramjet engine 62. This produces a second interceding cooler and lower velocity peripheral stratum of recirculation and inducted air adjacent to the combustor wall to aid in reducing combustor thermal loss and friction inefficiencies and improves the internal to external differential pressure gradient associated with the convergent ram-charged air and auxiliary supercharged air induction by the Venturi type combustion tube configuration of this invention. The air is thereby convergent converted efficiently into increasing the Venturi combustion tube's central air column's mass flow velocity.

The free-piston engine component provides a means to supplement the oxygen and air-mass for the optimum performance and operation of the Ramjet engine as well as the turbine engine component at low velocities, heavy work loads and high altitudes, as well as maximum obtainable functional velocity. This makes the units capable of improved operation with an otherwise inadequate supply of ambient airflow to furnish the required amount of propulsive medium and containing the required available oxidant.

The combined-cycle engine has a bypass air-cooling arrangement whereby the bypass ducting 64 also acts to supercharge convergent conducted air into the Venturi vortex vestibule combustor zone 61 of a Ramjet engine conformation embodiment as shown in FIG. 3. This air cooling arrangement is also capable of utilizing cooling air to furnish the required heated oxidant flow to operate afterburner configurations, including peripheral dump step and quarl fuel injector arrangements, with the combined-cycle engine to supercharge additional air into the low-pressure zone. This occurs prior to the exhaust nozzles of the J-tube and apex or vortex stratified Ramjet engine acting thereby as the afterburner combustor. Further, those oppositely directed air columns, at times, are required to be offset from the jut position of the auxiliary centrifugal airflow and from both the exhaust outlets 1, 47 of the Ramjet engine and the combined-cycle engine. The air columns are capable of being partially closed by the variable geometry cowling 1, 47, producing an afterburner combustor zone and exhaust port nozzle effect. The combined-cycle engine and the Ramjet engine have a surface of the stern (aft) movable element 1, 47 being made to move into a selected position, partially closing the exhaust nozzle conduit of the engines and bringing about a greater pressure differential within the volumetric confines of the engines. This is called the nozzle effect.

In the Ramjet engine, the variable area's geometry cross-section ratio exhaust expansion zone and nozzle and likewise the variable area geometry of the forward diffuser and/or compressor movable cowling assembly act co-operatively. They cooperatively insure a negative internal pressure to external pressure differential gradient while maintaining overall forward thrust and include a plurality of throat closure elements that are movable between a first position and a second position. The variable area air intake cowling has a first smaller then larger inlet area when the throat inlet elements are set in the first inlet position. The cowling then has a larger to smaller throat area when they are set in the second inlet outlet position. Finally, they have a second exhaust outlet area that in turn is first a larger to smaller cross-section area for the exhaust nozzle outlet than that of the exhaust inlet and visa versa controlling the exhaust pressure within the confines of the expansion zone. They are selectively synchronized to maintain and intensify this vital inverse differential pressure and fluid mass flow relationship.

The elements may be constructed similar enough to be made to act in an opposite series of configuration changes that act to transpose and reverse the whole pressure gradient operation of the Ramjet or J-tube engine, thereby reversing the operation of the J-tube engine as depicted in, for example, FIGS. 10D-10F. Herein is an illustrated schematic view of another variation of an apex or vortex stratified J-tube (Ramjet) engine, depicting an open vestibule Venturi apex and/or vortex recirculation combustion zone. In such a design, sliding or hinged elements are employed in such a like transposed manner as to allow them to be reversed as shown in FIGS. 10G-10I.

The unit assemblies supply fuel and oxidants and ignition to maintain operation of the engines (tanks, pumps, tubes, ducts, wires, batteries, generators and the like) (not shown). The combustor (combustion tube zone) assemblies 16, 17, 19, 51 or 66, 68, 70 of the J-tube engines 62 are connected within the units by tubes leading from pumps attached to fuel tanks. These in turn have attached an array of nozzles circumferentially or cross-section perpendicular and laterally "screen" spaced apart from one another. They can be radially or laterally positioned outward from each other or otherwise positioned apart from one another and at the positions of intersection of the bypass inlet conduits and that of the J-tube engine's combustor intake ports or dump step configurations. (See FIGS. 1, 3, 7 and 8.) Wires from batteries to coils are led from timing devices, bringing high voltage electricity to spark generated ignition and combustion downstream of the spark generators. (These are so-called catering systems.)

Such appropriate electrical elements are furnished throughout the units to meet all other required needs such as to furnish electricity to all other engines, motors, pumps, lights, instruments, switches, etc. The series of combined engines are arranged such that their longitudinal axes are aligned in a common plane that is generally parallel to a longitudinal axis of the unit and its contained engines although a pivotal or hinged arraignment between engines may be warranted. Arrangements for furnishing the required compressed oxidant for use when the combined series of engines making up the unit have a velocity that is less than a predetermined Ramjet engine transitional velocity presently set at approximately 3 to 4 Mach can be contained. Such arrangements can be otherwise operated under overloaded and/or engine starting conditions or while operating in the thin atmospheres of high altitude and to operate the free piston engine.

There are other types of suitable detonation cycle engines and combustion cycle engines that may be located secured to or within the unit and placed in such a manner so as to act as supercharging engines and take off assist devices or as the main boosters when the unit enters the outer reaches of the atmosphere, acting to supply the required velocity to the payload booster rocket. The units are made up of a particular type of combined-cycle engine, or other appropriate engine, and at least one Ramjet engine. One variant turbine fan-jet engine, designed to operate in one direction only, is referenced in an embodiment as represented in the view shown in FIG. 13. As shown in FIG. 13, this embodiment is distinguished basically by the change in the design of the driven impeller by the addition of a 45-degree cant or skewed angle to the dihedral 45 degrees of the drive vanes. That is, as shown in FIG. 13, impellers 20 and 27 each include a drive vane dihedral set at 45 degrees to the fluid flow and 45 degrees of tilt or inclined leaning and skewed, tangent acute angle a oblique to the rim of the impeller hub. Likewise, the vane angles are skewed in opposite transposed angles driving the combustion-mediating hub 26. Each Ramjet engine includes a combustor inlet bypass conduit interconnecting the combustor to the combined-cycle engine or other appropriate engine's supercharging pump housing and may act as part of the unit's configuration.

The combined-cycle engine is connected by conducting channeling and conduit constructions convergent toward the aft section of the central combustion zone ports or dump step arrangements of the apex or vortex stratified Ramjet or Ramjet conformation engine within the unit as shown by FIG. 3. The Ramjet engine has a central body consisting of the tubular combustor and attached conduit partition and/or dump step operable for converting a surface contact laminate airflow into a three-dimensional flowfield. The flowfield includes a substantial turbulent stratified flow defining air column within the combustor interior as can be seen from FIG. 8.

In one form, an airflow defining partition is operable for effecting both an outer circulation zone and a central circulation zone in the combustor. The outer circulation zone is partition stratified around and peripheral to the central circulation zone and is disposed inward of the outer stratified circulation zone. The fuel is injected first into the central circulation zone and into the core airflow and includes a plurality of fuel injectors for injecting the fuel directly into the airflow by the conformation of a dump step and quarl. Other Venturi tube convergent effective methods for at least partially mixing the fuel and the oxidizer prior to entering the central core combustion zone are also possible as shown in, for example, FIGS. 7 and 8.

Further fuel injector and electrical ignition devices are located peripheral to this central core zone to initiate ignition of rich stratified and/or otherwise partitioned air and fuel mixtures. Supercharged convergent combustible air and fuel mixtures are incorporated into the central core air-column along with the radiant heat of combustion and combustion by products during combustion to thermal condition the inducted pre-combustion air fuel mixtures. A fractional portion is carried up stream and re-circulated by thermal convection and radiation to provide a positive pressure differential within the combustor to pre-heat tubular combustor injectors.

The tubular combustor injectors are set into the supercharged induction partition conduit and are arranged to accept a plurality of periphery located fuel injector orifice jets 12 and igniters 24 that are employed to continually ignite inducted and supercharged combustible fuel and oxidizer mixture into the partition produced apex zone forming the Venturi convergent recirculation convection-preheating chamber partition 2. The igniters 24 are arranged and distributed adjacent to and forming the Venturi convergent combustion zone 61.

The turbulent stratified shear layer partitions the Venturi apex or vortex stratified zone using wall 60 and thereby ports the air and fuel mixture and/or combustion gasses into and adjacent to each of the stratified outer and central circulation zones. Thereby, convection pre-heating and heating and accelerating flame propagation into the central core combustion column occurs. A series of supplementary airflow directing vanes and deflecting blades and/or tubular directing combustor ports or tubular "screen" or dump step and quarl fuel injection arrangement 2, 74 is formed. They are set convergent and/or lateral toward the aft section of the apex Venturi combustor zone as shown in FIGS. 1 and 8 by example and are employed to supply supplementary supercharged conducted heated air and injected fuel into the swirling motion of the central air column forming an apex Venturi like zone and convergent into the combustion tube section and thereby into the expansion zone and exhausted. This adds an increased pressure differential supplemental impetus to the propulsive Venturi stratified central heated air combustion column.

The Ramjet engine may have a combustor with a diameter to length ratio of 1 to 1 ("the classical square dimension") or less.

The Ramjet engine may have a combustion tube with a diameter to length ratio of up to 1 to 6 such as shown in FIG. 10A.

The Ramjet engine may have a combustor with a diameter to length ratio at about 1 to 2 that is tunable such as shown in FIG. 10A.

The Ramjet engine can include an inlet 35 that employs a variable geometry flow control using at least one of a hinged or sliding component. A translating component and instrumentation controls the amount of air from the core combination-cycle turbine engine supercharging fan pump and is fed or bled into at least the Ramjet engine.

The Ramjet engine can include an interconnecting bypass duct that intersects the supercharging duct 52 at either an oblique angle or perpendicular to the high pressure supercharging compressor housing and may be part of the unit's construction.

One variation of the combined-cycle engine or Ramjet engine has pressurized oxygen containment vessels (not shown) being connected and made operable to the central drive shaft 41. The drive shaft 41 contains the centrally located free-piston engine's detonation chamber intake ports, and the vessels are also connected to and service injected oxygen into the combustion zones 86, 61 of the turbine and Ramjet engines as required.

The combined-cycle engine also has a similar forward and aft conforming cowling element 47, serving selectively relevant to and acting thereby as a Ramjet engine conformation variant and to partially close off or nozzle the exhaust ports when not being over-boosted. This element includes a fresh air outermost flow defining means and a fueling means consisting of a plurality of fuel injectors and spark ignition ports placed inward in a radial peripheral distribution to function as the Ramjet engine conformation. See, for example, the mechanism 66 and its support 88 as shown in FIG. 8.

The fuel injectors 40 of the turbine-jet engine are mounted in the interior facing engine wall 4 protruding thereby into flow directing channel ports that have been cut into the wall convergent toward the spark ignition port. The fuel injectors and ports function in unison to produce combustion and the propulsion supply of supercharged air in conjunction with an aft most buff or water drop shaped ellipsoid centerbody housing producing the required Venturi tube constricting element. These elements act directly without any defined combustion chambers.

Contained within this centerbody housing is the combined-cycle turbine-jet supercharging engine 100 functioning as the embodiment of a core engine central to a Ramjet engine conformation airflow supercharge defining means that is operable for effecting both an outer circulation zone and an inner central recirculation zone of the combustion gases. (See, for example, FIGS. 10E, 10G and 10J.) The outermost peripheral zone consists of the heated air bypass circulation zone. A recirculation zone is downstream of a fuel injection dump step and quarl. The outermost preheated supercharged fresh air circulation zone of the Ramjet conformation is toroidal in shape and completely surrounds the teardrop ellipsoid and toroidal shaped housing containing the central core combined-cycle turbine-jet supercharging engine. The central combustion zone is disposed inward of the outer fresh air supercharged zone.

The fueling means is operable for fueling the outer circulation zone of the peripheral Ramjet conformation of the module, creating combustion of the oxidizer and fuel ignited by the preheated supercharged air, superheated combustion gases and a greater high-pressure differential between these two stratified zones. An improved afterburner for the combined-cycle engine and the Ramjet engine is thereby produced.

The exhaust gases need not be expelled near the central shaft and bearings of the jet turbine engine drive, but may be allowed to remain at a peripheral distance from the bearings, journals and shaft, sparing them from the heat of combustion and keeping the peripheral by-pass cooling air (oxidant) readily available for cooling the engine and for use with the proper fuel injection to act as heated air (oxidant) for the Ramjet engine. Centrally located combined-cycle turbine fan-jet engine afterburner arrangements are included.

The combined-cycle engine may be used independently or together with the Ramjet engine in other applications such as designs for air elevation-suspension and ground effect vehicles.

An embodiment of the combined-cycle engine may be designed as a variant design, to run in one rotational direction with an appropriate change in the combustion-mediating hub.

What I claim is:
1. An engine comprising:
an engine housing;
a drive shaft mounted within the engine housing;
a first impeller mounted on the drive shaft for movement therewith and having vanes inclined in a first direction relative to a rotational axis of the driveshaft;
a second impeller mounted on the drive shaft for movement therewith and having vanes inclined in the first direction relative to the rotational axis of the driveshaft;
a combustion mediating hub located between the second impeller and the first impeller and mounted on the drive shaft with a bearing for freely rotatable movement in both the first direction and a second direction about the drive shaft, the combustion mediating hub including an annular plate having a first surface, a second surface opposing the first surface, and an outer peripheral wall extending between the first surface and the second surface, the annular plate including an inner portion adjacent to the bearing and an outer portion adjacent to the outer peripheral wall, a first plurality of blades mounted on the first surface of the annular plate on at least the outer portion of the annular plate and extending axially toward the second impeller and a second plurality of blades mounted on the second surface of the annular plate on at least the outer portion of the annular plate and extending axially toward the first impeller, the first plurality of blades and the second plurality of blades inclined in the second direction;
an ignition source extending through the engine housing into an area between the outer peripheral wall of the annular plate and an inner wall of the engine housing; and
a fuel source extending through the engine housing into the area between the outer peripheral wall of the annular plate and the inner wall of the engine housing.

2. The engine of claim 1, further comprising:
a ramjet including a combustor zone;
an impeller pump vane mounted on the drive shaft for movement therewith;
an opening formed in the engine housing and providing air to a path from the impeller pump vane to the combustor zone of the ramjet.

3. The engine of claim 2, further comprising:
a first air cowling arranged about a first end of the engine near the impeller pump vane; and
a second air cowling arranged about a second end of the engine opposite from the first air cowling.

4. The engine of claim 3 wherein the first air cowling and the second air cowling have variable dimensions.

5. The engine of claim 1 wherein the first impeller, the second impeller and the combustion mediating hub are mounted for axial movement along the drive shaft.

6. The engine of claim 1, further comprising:
a spline and toggle carriage coupled to a toggle extension to move the first impeller, the second impeller and the combustion mediating hub axially along the drive shaft.

7. The engine of claim 1 wherein the drive shaft forms a housing of a free piston assembly, the housing supporting a free piston engaged with an interior of the housing such that reciprocal motion of the free piston causes rotation of the drive shaft.

8. The engine of claim 7, further comprising:
a first detonation chamber in contact with a first end of the free piston; and
a second detonation chamber in contact with a second end of the free piston opposed to the first end.

9. The engine of claim 8, further comprising:
a first fuel path extending into the first detonation chamber;
a first oxidant path extending into the first detonation chamber;
a first igniter extending into the first detonation chamber;
a second fuel path extending into the second detonation chamber;
a second oxidant path extending into the second detonation chamber; and
a second igniter extending into the second detonation chamber.

10. The engine of claim 1 wherein at least one of the first impeller or the second impeller comprises a set of dihedral vanes.

11. The engine of claim 10 wherein a first vane of the set of dihedral vanes is inclined at an acute angle with respect to a second vane of the set of dihedral vanes.

12. The engine of claim 1, further comprising:
an outer engine housing surrounding the engine housing.

13. The engine of claim 12 wherein the outer engine housing extends axially to a length longer than an axial length of the engine housing, the engine further comprising:
an impeller pump vane mounted for movement with the drive shaft beyond the axial length of the engine housing and having blades extending radially from the drive shaft to face the outer engine housing.

14. The engine of claim 12 wherein the outer engine housing extends axially to a length longer than an axial length of the engine housing, the engine further comprising:
a ramjet including a combustor zone;
an impeller pump vane mounted for movement with the drive shaft beyond the axial length of the engine housing;
an annular air pump housing surrounding the impeller pump vane and extending to the outer engine housing; and
an air bypass conduit extending from the annular air pump housing to the ramjet.

15. The engine of claim 14 wherein the ramjet further comprises:
a conically-shaped air intake cowling having a narrower end and a wider end, the narrower end of the air intake cowling coupled to the combustor zone;
a conically-shaped air exhaust cowling having a narrower end and a wider end, the narrower end of the air exhaust cowling coupled to the combustor zone;
an igniter extending into the combustor zone;
a cone-shaped cowling extending about the air intake cowling and having an opening coupled to the air bypass conduit;
an annular ignition pre-chamber extending about the combustor zone and separated from the cone-shaped cowling by a partitioning wall including an annular bypass duct;
at least one fuel injector orifice jet extending into the ignition pre-chamber; and
at least one igniter extending into the ignition pre-chamber.

16. The engine of claim 1, further comprising:
a ramjet connected to the engine housing, the ramjet including:
a combustor zone;
a conically-shaped air intake cowling having a narrower end and a wider end, the narrower end of the air intake cowling coupled to the combustor zone;
a conically-shaped air exhaust cowling having a narrower end and a wider end, the narrower end of the air exhaust cowling coupled to the combustor zone;
an igniter extending into the combustor zone;
a cone-shaped cowling extending about the air intake cowling;
an annular ignition pre-chamber extending about the combustor zone and separated from the cone-shaped cowling by a partitioning wall including an annular bypass duct;
at least one fuel injector orifice jet extending into the ignition pre-chamber; and
at least one igniter extending into the ignition pre-chamber.

17. The engine of claim 1, further comprising:
a piston housed within the drive shaft;
a first combustion chamber located at a first end of the drive shaft and in communication with a first end of the piston;
a second combustion chamber located at a second end of the drive shaft and in communication with a second end of the piston;
a respective ignition source extending into each of the first and second combustion chambers;
a respective fuel input extending into each of the first and second combustion chambers; and
a respective oxidant input extending into each of the first and second combustion chambers; and wherein
the first impeller and the second impeller form an output device coupled to the drive shaft for movement therewith.

18. The engine of claim 1 wherein the inner portion is substantially flat on both the first surface and the second surface from the bearing to the outer portion, the first plurality of blades extends only from the outer portion of the first surface, and the second plurality of blades extends only from the outer portion of the second surface.

19. The engine of claim 1 wherein each of the first plurality of blades and each of the second plurality of blades extends axially in a direction substantially perpendicular to the rotational axis before extending axially inclined in the second direction.

20. The engine of claim 19 wherein the inner portion is substantially flat on both the first surface and the second surface from the bearing to the outer portion, the first plurality of blades extends only from the outer portion of the first surface, and the second plurality of blades extends only from the outer portion of the second surface.

* * * * *